(12) United States Patent
Sato et al.

(10) Patent No.: US 12,040,709 B2
(45) Date of Patent: Jul. 16, 2024

(54) SWITCHING POWER SUPPLY DEVICE

(71) Applicant: ROHM CO., LTD., Kyoto (JP)

(72) Inventors: Kosuke Sato, Kyoto (JP); Tetsuo Tateishi, Kyoto (JP); Shingo Hashiguchi, Kyoto (JP); Isao Takobe, Kyoto (JP); Yuhei Yamaguchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 305 days.

(21) Appl. No.: 17/615,931

(22) PCT Filed: Jun. 12, 2020

(86) PCT No.: PCT/JP2020/023307
§ 371 (c)(1),
(2) Date: Dec. 2, 2021

(87) PCT Pub. No.: WO2020/251045
PCT Pub. Date: Dec. 17, 2020

(65) Prior Publication Data
US 2022/0321007 A1    Oct. 6, 2022

(30) Foreign Application Priority Data

Jun. 14, 2019 (JP) .................. 2019-110968
Mar. 5, 2020 (JP) .................. 2020-037654
Mar. 5, 2020 (JP) .................. 2020-037659

(51) Int. Cl.
*H02M 3/158* (2006.01)
*B60R 16/033* (2006.01)
(Continued)

(52) U.S. Cl.
CPC .......... *H02M 3/158* (2013.01); *B60R 16/033* (2013.01); *H02M 1/088* (2013.01); *H02M 1/32* (2013.01); *H02M 1/44* (2013.01)

(58) Field of Classification Search
CPC .................. H02M 1/00; H02M 3/00
See application file for complete search history.

(56) References Cited

U.S. PATENT DOCUMENTS 6,271,651 B1    8/2001  Stratakos et al.
9,178,420 B1 *  11/2015 Hawley ............. H02M 3/158
(Continued)

FOREIGN PATENT DOCUMENTS

JP    2010525786    7/2010
JP    2012253949    12/2012
JP    2015156777    8/2015

OTHER PUBLICATIONS

International Search Report in International Appln. No. PCT/JP2020/023307, dated Sep. 8, 2020, 4 pages (with English Translation).

*Primary Examiner* — Rexford N Barnie
*Assistant Examiner* — Joseph N Inge
(74) *Attorney, Agent, or Firm* — Fish & Richardson P.C.

(57) ABSTRACT

A switching power supply device includes a first switch with a first terminal connectable to an application terminal for the input voltage and a second terminal connectable to the first terminal of an inductor; a second switch with a first terminal connectable to the first terminal of the inductor and a second terminal connectable to an application terminal for a voltage lower than the input voltage; a third switch with a first terminal connectable to the first terminal of the inductor and a second terminal connectable to the second terminal of the inductor; a detector; and a controller. The controller produces, after occurrence or a sign of occurrence of an overshoot in the output voltage is detected by the detector until settlement of the overshoot in the output voltage, a control state in which to keep the first and second switches off and the third switch on.

17 Claims, 36 Drawing Sheets

(51) Int. Cl.
*H02M 1/088* (2006.01)
*H02M 1/32* (2007.01)
*H02M 1/44* (2007.01)

(56) References Cited

U.S. PATENT DOCUMENTS

| | | |
|---|---|---|
| 10,454,370 B2 * | 10/2019 | Babazadeh ............. H02M 1/32 |
| 10,574,132 B2 * | 2/2020 | Young ................... H02M 3/156 |
| 2008/0291711 A1 | 11/2008 | Williams |
| 2009/0115388 A1 * | 5/2009 | Miyazaki ............... H02M 3/158 |
| | | 323/282 |
| 2014/0021930 A1 * | 1/2014 | Liu ..................... H02M 3/1584 |
| | | 323/271 |
| 2018/0049283 A1 * | 2/2018 | Lee ........................ H05B 45/38 |

* cited by examiner

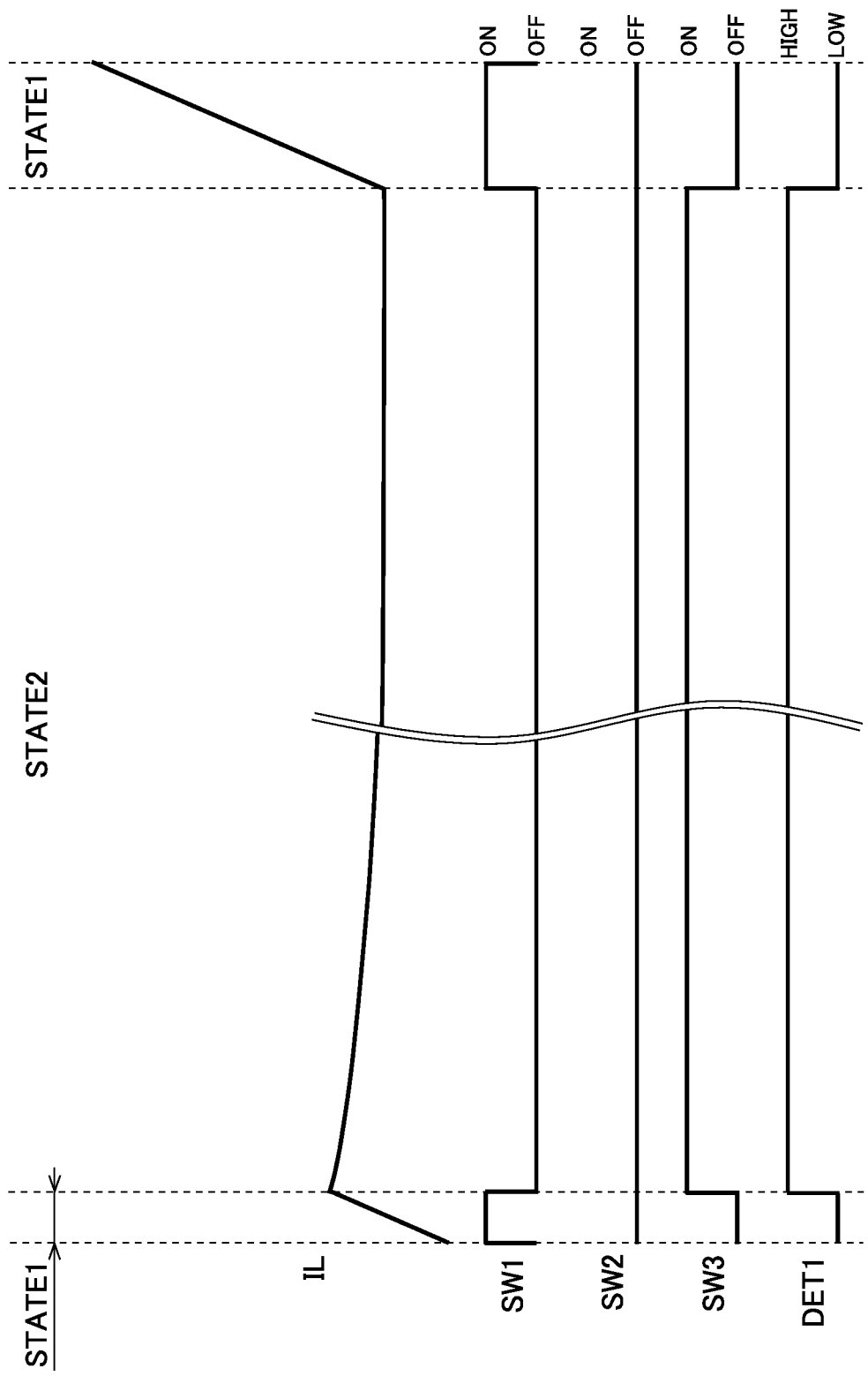

SWITCHING POWER SUPPLY DEVICE

CROSS REFERENCE TO RELATED APPLICATIONS

This application is a U.S. National Phase application under 35 U.S.C. § 371 of International Patent Application No. PCT/JP2020/023307, filed on Jun. 12, 2020, which claims priority to Japanese Application No. 2020-037659, filed Mar. 5, 2020, Japanese Application No. 2020-037654, filed Mar. 5, 2020; and Japanese Application No. 2019-110968, filed Jun. 14, 2019, the disclosures of which are incorporated herein by reference.

TECHNICAL FIELD

The invention disclosed herein relates to a switching power supply device that bucks (steps down) an input voltage to an output voltage.

BACKGROUND ART

In a bucking switching power supply device that bucks an input voltage to an output voltage, in general, a sharp fall in the output current causes an overshoot in the output voltage.

LIST OF CITATIONS

Patent Literature

Patent Document 1: U.S. Pat. No. 6,271,651 (Line 2-45 in Column 5)

SUMMARY OF THE INVENTION

Problem to be Solved by the Invention

By increasing the capacitance of an output capacitor, it is possible to suppress an overshoot in the output voltage. However, increasing the electrostatic capacitance of the output capacitor leads to an increase in the size and the cost of a device. Thus, there has been demand for a method for suppressing an overshoot in the output voltage without increasing the electrostatic capacitance of the output capacitor.

The switching power supply device disclosed in Patent Document 1 turns a short-circuit switch connected in parallel with an inductor on an off alternately or varies the on-resistance of the short-circuit switch connected in parallel with the inductor, thereby to suppress an undershoot and an overshoot in the output voltage.

However, the switching power supply device disclosed in Patent Document 1 turns the short-circuit switch and the rectification switch both on when suppressing an overshoot in the output voltage, and thus, inconveniently, a current passes from the load via the short-circuit switch and the rectification switch to the ground, resulting in increased power loss.

In addition, as a method for suppressing an overshoot in the output voltage without increasing the electrostatic capacitance of the output capacitor, one that does not vary the switching frequency is preferable. When the switching frequency varies, also the frequency of noise varies, and this may reduce the effect of noise suppressing means (for example, a filter circuit) for suppressing noise of a fixed frequency.

Means for Solving the Problem

According to one aspect of what is disclosed herein, a switching power supply device configured to buck an input voltage to an output voltage may include: a first switch configured such that its first terminal is connectable to an application terminal for the input voltage, and that its second terminal is connectable to the first terminal of an inductor; a second switch configured such that its first terminal is connectable to the first terminal of the inductor and to the second terminal of the first switch, and that its second terminal is connectable to an application terminal for a voltage lower than the input voltage; a third switch configured such that its first terminal is connectable to the first terminal of the inductor, to the second terminal of the first switch, and to the first terminal of the second switch, and that its second terminal is connectable to the second terminal of the inductor; a detector configured to detect occurrence, or a sign of occurrence, of an overshoot in the output voltage; and a controller configured to turn on and off the first, second, and third switches. The controller may be configured to produce, after occurrence, or a sign of occurrence, of an overshoot in the output voltage is detected by the detector until the overshoot in the output voltage settles down, a control state in which the first and second switches are kept off and the third switch is kept on (a first configuration).

In the switching power supply device according to the first configuration described above, the controller may be configured to turn the first and second switches off and the third switch on when the detector detects occurrence of, or a sign of occurrence of, an overshoot in the output voltage (a second configuration).

In the switching power supply device according to the second configuration described above, the detector may be configured to detect also settlement of an overshoot in the output voltage, and the controller may be configured to turn the third switch off when the detector detects settlement of an overshoot in the output voltage (a third structure).

In the switch power supply device according to the first configuration described above, the detector may be configured to detect also settlement of an overshoot in the output voltage, and the controller may be configured such that, in a period after the detector detects occurrence, or sign of occurrence, of an overshoot in the output voltage until the detector detects settlement of the overshoot in the output voltage, the controller keeps the first switch off when at least the third switch is on, keeps the second switch off when at least the third switch is on, and turns on and off the third switch at a fixed period (a fourth configuration).

In the switching power supply device according to the fourth configuration described above, in a period after the detector detects occurrence, or a sign of occurrence, of an overshoot in the output voltage until the detector detects settlement of the overshoot in the output voltage, an off-period of the third switch may have a fixed duration (a fifth configuration).

In the switching power supply device according to the fifth configuration described above, in a period after the detector detects occurrence, or a sign of occurrence, of an overshoot in the output voltage until the detector detects settlement of the overshoot in the output voltage, the duration of the off-period of the third switch may be equal to or shorter than one-tenth of the fixed period (a sixth configuration).

The switching power supply device according to any of the fourth to sixth configurations described above may be configured to generate a voltage of 1.8 MHz or higher but 2.1 MHz or lower at the connection node between the first and second switches (a seventh configuration).

In the switching power supply device according to any of the fourth to seventh configurations described above, the third switch may include a first switching element and a second switching element that are connected in series with each other (an eighth configuration).

In the switching power supply device according to the eighth configuration described above, in an on-period of the third switch, the first and second switching elements may be on, and, in the off-period of the third switch, the first switching element may be off and the second switching element may be on (a ninth configuration).

The switching power supply device according to the eighth or ninth configuration described above may further include a clamper configured to clamp a voltage at the connection node between the first and second switching elements within a predetermined range (a tenth configuration).

According to another aspect of what is disclosed herein, a switch control device may be configured to turn on and off a first switch configured such that its first terminal is connectable to an application terminal for an input voltage and that its second terminal is connectable to the first terminal of an inductor, a second switch configured such that its first terminal is connectable to the first terminal of the inductor and to the second terminal of the first switch and that its second terminal is connectable to an application terminal for a voltage lower than the input voltage, and a third switch configured such that its first terminal is connectable to the first terminal of the inductor, to the second terminal of the first switch, and to the first terminal of the second switch and that its second terminal is connectable to the second terminal of the inductor. The switch control device may include an acquirer configured to acquire a detection result from a detector for detecting occurrence, or sign of occurrence, of an overshoot in the output voltage, and a suppressor configured to turn on and off the first, second, and third switches in accordance with the detection result acquired by the acquirer to suppress an overshoot in the output voltage by producing, after occurrence, or a sign of occurrence, of an overshoot in the output voltage is detected by the detector until the overshoot in the output voltage settles down, a control state in which the first and the second switches are kept off and the third switch is kept on (an eleventh configuration).

In the switch control device according to the eleventh configuration described above, the suppressor may be configured such that, when the detector detects occurrence, or a sign of occurrence, of an overshoot in the output voltage, the suppressor turns the first and second switches off and the third switch on to suppress the overshoot in the output voltage (a twelfth configuration).

In the switch control device according to the twelfth configuration described above, the detector may be configured to detect also settlement of an overshoot in the output voltage, and the suppressor may be configured to turn the third switch off when the detector detects settlement of an overshoot in the output voltage (a thirteenth configuration).

In the switch control device according to the eleventh configuration described above, the detector may be configured to detect also settlement of an overshoot in the output voltage, and the suppressor may be configured such that, in a period after the detector detects occurrence, or a sign of occurrence, of an overshoot in the output voltage until the detector detects settlement of the overshoot in the output voltage, the suppressor keeps the first switch off when at least the third switch is on, keeps the second switch off when at least the third switch is on, and turns on and off the third switch at a fixed period to suppress an overshoot in the output voltage (a fourteenth configuration).

In the switch control device according to the fourteenth configuration described above, in a period after the detector detects occurrence, or a sign of occurrence, of an overshoot in the output voltage until the detector detects settlement of the overshoot in the output voltage, the off-period of the third switch may have a fixed duration (a fifteenth configuration).

In the switch control device according to the fifteenth configuration described above, in a period after the detector detects occurrence, or a sign of occurrence, of an overshoot in the output voltage until the detector detects settlement of the overshoot in the output voltage, the duration of the off-period of the third switch may be equal to or shorter than one-tenth of the fixed period (a sixteenth configuration).

The switch control device according to any of the fourteenth to sixteenth configuration described above may be configured to generate a voltage of 1.8 MHz or higher but 2.1 MHz or lower at the connection node between the first and second switches (a seventeenth configuration).

In the switch control device according to any of the fourteenth to sixteenth configuration described above, the third switch may include a first switching element and a second switching element that are connected in series with each other (an eighteenth configuration).

In the switch control device according to the eighteenth configuration described above, in the on-period of the third switch, the first and second switching elements may be on, and, in the off-period of the third switch, the first switching element may be off and the second switching element may be on (a nineteenth configuration).

According to yet another aspect of what is disclosed herein, a vehicle-mounted appliance includes the switching power supply device according to any of the first to tenth configuration described above or the switch control device according to any of the eleventh to nineteenth configuration described above (a twentieth configuration).

According to yet another aspect of what is disclosed herein, a vehicle includes the vehicle-mounted appliance according to the twentieth configuration described above and a battery for supplying the vehicle-mounted appliance with electric power (a twenty first configuration).

Advantageous Effects of the Invention

According to the invention disclosed herein, it is possible to suppress an overshoot in the output voltage in a switching power supply device.

BRIEF DESCRIPTION OF DRAWINGS

FIG. 2 is a time chart showing a first example of operation of the switching power supply device according to the first configuration example on occurrence of an overshoot in an output voltage;

DESCRIPTION OF EMBODIMENTS

In the present description, a constant voltage means a voltage that is constant under ideal conditions, and in reality it can vary slightly with change in temperature or the like.

In the present description, a MOS transistor denotes a field-effect transistor in which the gate is structured to have at least three layers: "a layer of an electrical conductor or of a semiconductor such as polysilicon with a low resistance value", "an insulation layer", and "a P-type, N-type or intrinsic semiconductor layer". That is, the structure of the gate of a MOSFET is not limited to a three-layer structure composed of metal, oxide, and semiconductor layers.

<First Configuration Example of a Switching Power Supply Device>

Figure 1A:
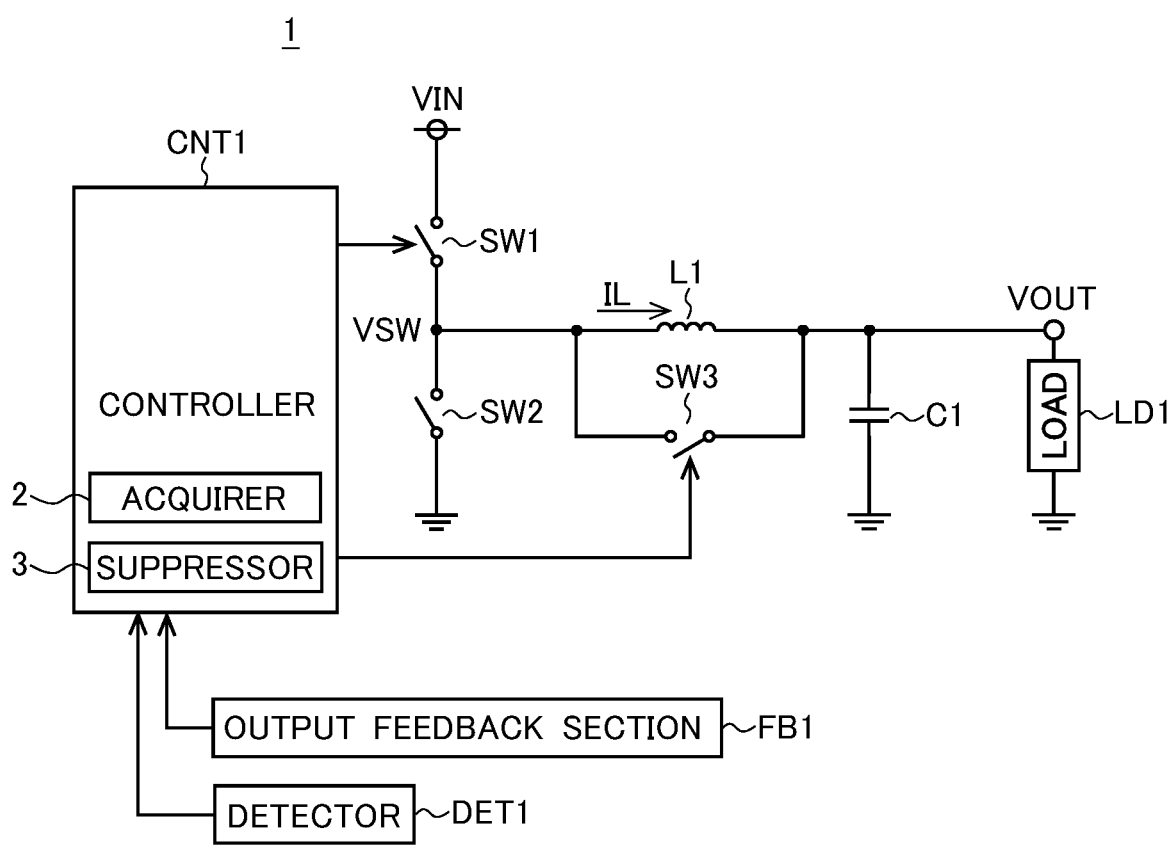
FIG. 1A is a diagram showing a first configuration example of an asynchronous rectification switching power supply device.
Figure 1B:
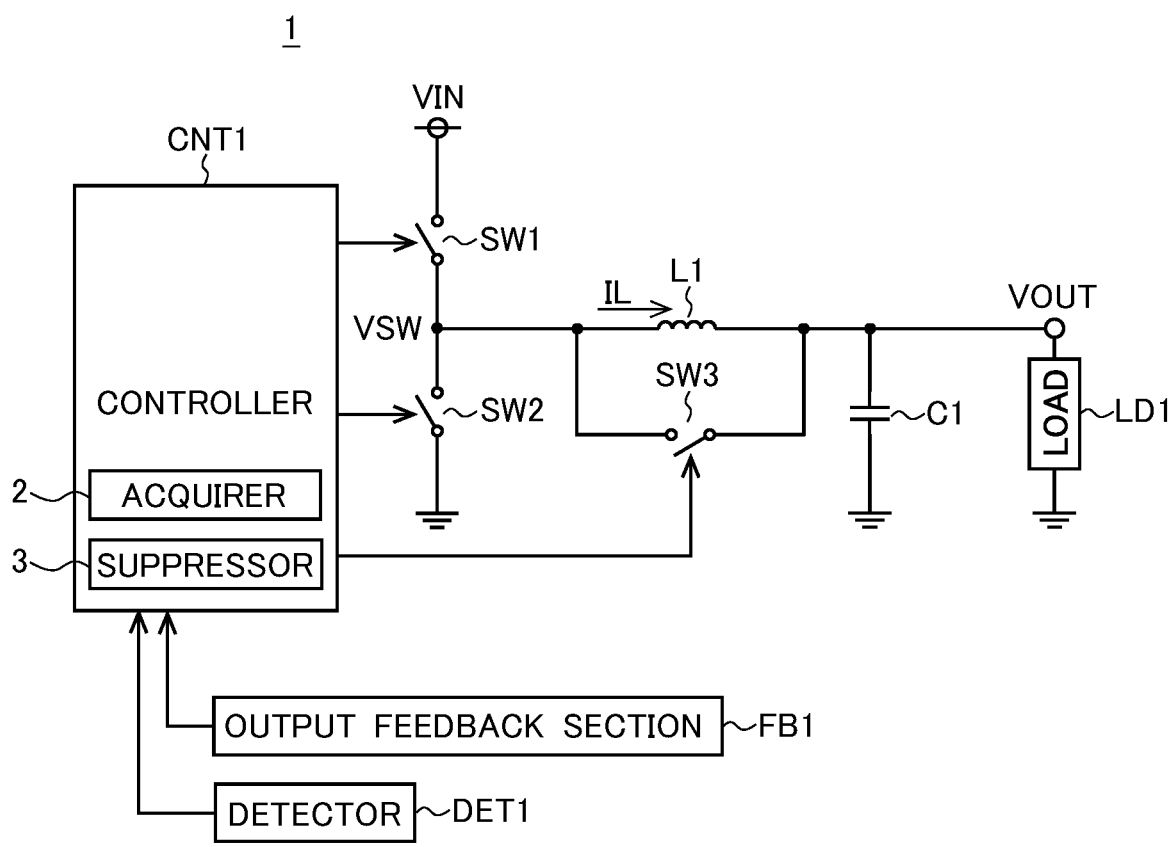
FIG. 1B is a diagram showing a first configuration example of a synchronous rectification switching power supply device.

FIGS. 1A and 1B are diagrams showing a configuration example of a switching power supply device. The switching power supply device 1 shown in FIGS. 1A and 1B is a switching power supply device that bucks (steps down) an input voltage VIN to an output voltage VOUT and includes a controller CNT1, a first to a third switch SW1 to SW3, an inductor L1, an output capacitor C1, an output feedback section FB1, and a detector DET1.

The controller CNT1 turns on and off the first to third switches SW1 to SW3 in accordance with the respective outputs of the output feedback section FB1 and the detector DET1. In other words, the controller CNT1 is a switching control device that turns on and off the first to third switches SW1 to SW3. The controller CNT1 includes an acquirer 2 that acquires the detection result from the detector DET1 and a suppressor 3 that, based on the detection result from the detector DET1 acquired by the acquirer 2, turns on and off the first switch SW1, the second switch SW2, and the third switch SW3 to suppress an overshoot in the output voltage VOUT.

For example, when the detector DET1 detects occurrence of an overshoot in the output voltage VOUT, the suppressor 3 turns the first and second switches SW1 and SW2 off and the third switch SW3 on to suppress the overshoot in the output voltage VOUT. For another example, after the detector DET1 detects occurrence of an overshoot in the output voltage VOUT until the detector DET1 detects settlement of the overshoot in the output voltage VOUT, the suppressor 3 keeps the first and second switches SW1 and SW2 off and turns the third switch SW3 on and off at a fixed period to suppress the overshoot in the output voltage VOUT.

The acquirer 2 and the suppressor 3 may each be achieved on a software basis or with hardware circuits, or may be achieved through coordinated operation of software and hardware.

The first switch SW1 is configured such that its first terminal is connectable to an application terminal for the input voltage VIN and that its second terminal is connectable to the first terminal of the inductor L1. The first switch SW1 conducts and cuts off the current path from the application terminal for the input voltage VIN to the inductor L1. As the first switch SW1, for example, a P-channel MOS transistor or an N-channel MOS transistor can be used. For example, with an N-channel MOS transistor used as the first switch SW1, a bootstrap circuit or the like may be provided in the switching power supply device 1 so as to generate a voltage higher than the input voltage VIN.

The second switch SW2 is configured such that its first terminal is connectable to the first terminal of the inductor L1 and to the second terminal of the first switch SW1, and that its second terminal is connectable to an application terminal for the ground potential. The second switch SW2 conducts and cuts off the current path from the application terminal for the ground potential to the inductor L1. In a modified version of the configuration example under discussion, the second switch SW2 may be configured such that its second terminal is connectable to an application terminal for a voltage that is lower than the input voltage VIN but other than the ground potential. As the second switch SW2, for example, a diode or an N-channel MOS transistor can be used.

For example, with a diode used as the second switch SW2, the switching power supply device 1 acts as an asynchronous rectification switching power supply device as shown in FIG. 1A.

When the switching power supply device 1 acts as an asynchronous rectification switching power supply device, the controller CNT1 controls the bias voltage applied to the switch SW2 (diode) by turning the switch SW1 on and off Whether the switch SW2 (diode) is on or off is determined by the bias voltage applied to the switch SW2 (diode); thus, the controller CNT1 turns the switch SW2 (diode) on and off indirectly.

For example, with an N-channel MOS transistor used as the second switch SW2, the switching power supply device 1 acts as a synchronous rectification switching power supply device as shown in FIG. 1B. When the switching power supply device 1 acts as a synchronous rectification switching power supply device, the switching power supply device 1 may be configured to operate in a current continuous mode under a light load or may be configured to have a reverse current prevention function and operate in a current discontinuous mode under a light load.

Through the switching operation by the first and second switches SW1 and SW2, a pulsating switching voltage VSW is generated at the connection node between the first and second switches SW1 and SW2. The inductor L1 and the output capacitor C1 smooth the pulsating switching voltage VSW to generate the output voltage VOUT and feeds it to an application terminal for the output voltage VOUT. To the application terminal for the output voltage VOUT, a load LD1 is connected, and to the load LD1, the output voltage VOUT is fed.

Figure 1C:
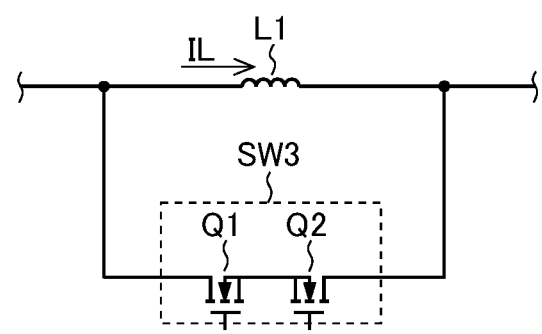
FIG. 1C is a diagram showing a configuration example of a third switch.
Figure 1D:
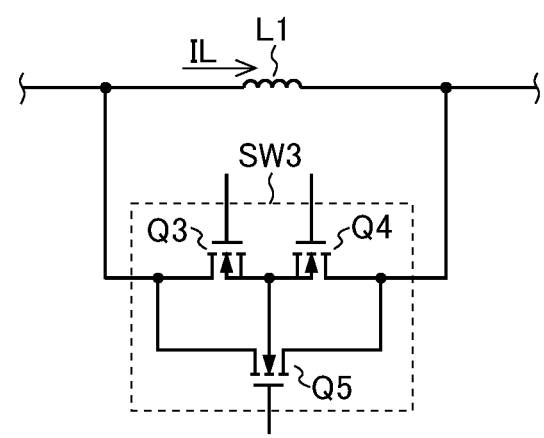
FIG. 1D is a diagram showing another configuration example of the third switch.

The third switch SW3 is configured such that its first terminal is connectable to the first terminal of the inductor L1, to the second terminal of the first switch SW1, and to the first terminal of the second switch SW2, and that its second terminal is connectable to the second terminal of the inductor L1. In other words, the third switch SW3 is connected in parallel with the inductor L1. As the third switch SW3, for example, an N-channel MOS transistor can be used. The third switch SW3 may be formed with a plurality of elements. A third switch SW3 formed with a plurality of elements can be, for example, a third switch SW3 as shown in FIG. 1C including two N-channel MOS transistors Q1 and Q2 of which the back gates are connected together, or a third switch as shown in FIG. 1D including three N-channel MOS transistors Q3 to Q5 of which the back gates are connected together.

The output feedback section FB1 generates and outputs a feedback signal in accordance with the output voltage VOUT. As the output feedback section FB1, for example, a resistance voltage divider circuit can be used that divides the output voltage VOUT with resistors to generate the feedback signal. For another example, the output feedback section FB1 may be configured to receive the output voltage VOUT and output it as it is as a feedback signal. The output feedback section FB1 may be configured to generate and output, in addition to a feedback signal in accordance with the output voltage VOUT, also a feedback signal in accordance with the current that passes through the inductor L1 (hereinafter referred to as the "inductor current IL"). Configuring the output feedback section FB1 to additionally generate a feedback signal in accordance with the inductor current IL makes current mode control possible.

The detector DET1 detects occurrence and settlement of an overshoot in the output voltage VOUT. As the detector DET1, for example, a comparator can be used that receives the output voltage VOUT at its non-inverting input terminal and receives a constant voltage (a voltage higher than the target value of the output voltage VOUT) at its inverting input terminal. When an overshoot occurs in the output voltage VOUT, the comparator switches its output signal from low level to high level. When the overshoot in the output voltage VOUT settles down, the comparator switches its output signal from high level to low level. FIG. 2 referred to later shows the output signal in this example.

A configuration is also possible where the comparator receives, instead of the output voltage VOUT, a division voltage of the output voltage VOUT at its non-inverting input terminal and receives, instead of the constant voltage, a division voltage of the constant voltage at its inverting input terminal.

Also, by configuring the comparator as a hysteresis comparator or by providing a comparator for detecting occurrence of an overshoot and a comparator for detecting settlement of an overshoot separately, it is possible to differentiate the value of the output voltage VOUT at which to detect occurrence of an overshoot and that at which to detect settlement of an overshoot.

The detector DET1 does not necessarily have to detect settlement of an overshoot in the output voltage VOUT. For example, a configuration is also possible where a counter is included in the controller CNT1 and, when the counter counts a given time after detection of occurrence of an overshoot in the output voltage VOUT by the detector DET1, the controller CNT1 judges that the overshoot in the output voltage VOUT has settled down.

In another modified version of the configuration example under discussion, when the detector DET1 detects a sign of occurrence of an overshoot in the output voltage VOUT, the suppressor 3 described above keeps the first and second switches SW1 and SW2 off and keeps the third switch SW3 on so as to suppress the overshoot in the output voltage VOUT.

In yet another modified version of the configuration example under discussion, when the detector DET1 detects a sign of occurrence of an overshoot in the output voltage VOUT, the suppressor 3 described above keeps the first and second switches SW1 and SW2 off and turns the third switch SW3 on and off at a fixed period so as to suppress the overshoot in the output voltage VOUT.

A sign of occurrence of an overshoot in the output voltage VOUT can be detected, for example with a load LD1 that varies regularly and that becomes lighter sharply after a specific variation pattern, by detecting a variation pattern in the load current that corresponds to that specific variation pattern.

<First Operation Example of the Switching Power Supply Device on Occurrence of an Overshoot in the Output Voltage>

FIG. 2 is a time chart showing a first example of operation of the switching power supply device 1 on occurrence of an overshoot in the output voltage VOUT.

When the detector DET1 detects occurrence of an overshoot in the output voltage VOUT, under the control of the controller CNT1, the switching power supply device 1 goes into a second state STATE2. FIG. 2 is a time chart observed when the detector DET1 detects occurrence of an overshoot in the output voltage VOUT in the middle of a first state STATE1 (in the middle of an on-duty period of the switch voltage VSW), leading to the output from the detector DET1 turning from low level to high level and the switching power supply device 1 shifting from the first state STATE1 to the second state STATE2. In the first state STATE1, under the control of the controller CNT1, the first switch SW1 is kept on, the second switch SW2 is kept off, and the third switch SW3 is kept off.

Figure 3:
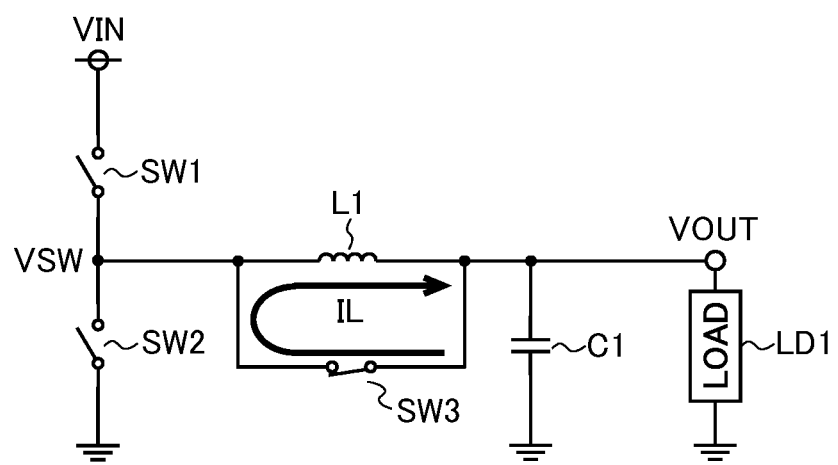
FIG. 3 is a diagram showing how an inductor current is regenerated.

In the second state STATE2, under the control of the controller CNT1, the first and second switches SW1 and SW2 are kept off and the third switch SW3 is kept on. When an overshoot occurs in the output voltage VOUT and the switching power supply device 1 shifts to the second state STATE2, as shown in FIG. 3, the inductor current IL is regenerated in a closed circuit including the inductor L1 and the third switch SW3. This makes it possible to cut off the supply of current toward the load LD1. Since, in the second state STATE2, both the first and second switches SW1 and SW2 are kept off, the output voltage VOUT can be clamped around the level at the occurrence of the overshoot. That is, on occurrence of an overshoot in the output voltage VOUT, by keeping the first and second switches SW1 and SW2 off and the third switch SW3 on, it is possible to prevent the output voltage VOUT from increasing further, and thus to suppress an overshoot in the output voltage VOUT.

Figure 4:
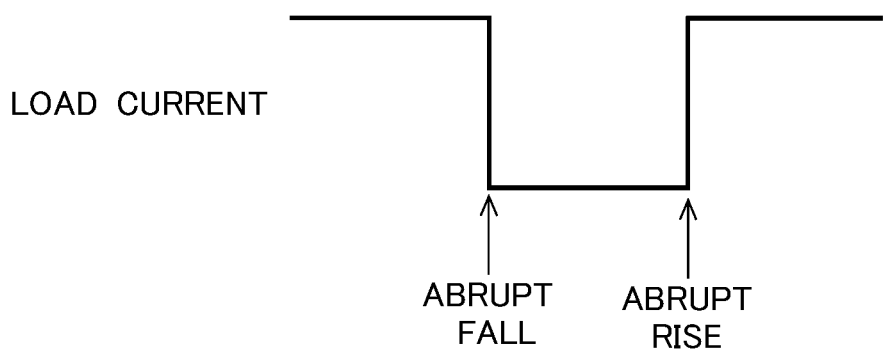
FIG. 4 is a time chart of a load current.

For another example, when the load current (the output current of the switching power supply device 1) falls abruptly and then rises abruptly as shown in FIG. 4, by releasing the regenerated energy stored in the closed circuit including the inductor L1 and the third switch SW3 toward the load LD1, it is possible to suppress also an undershoot in the output voltage VOUT caused by an abrupt rise in the load current.

In this operation example, the switching power supply device 1 is kept in the second state STATE2 until the detector DET1 detects settlement of an overshoot in the output voltage VOUT. While the second state STATE2 is maintained, the inductor current IL decreases gradually due to the on-resistance of the third switch SW3. While, in FIG. 2, when the detector DET1 detects settlement of an overshoot in the output voltage VOUT and the output from the detector DET1 turns from high level to low level, the switching power supply device 1 shifts from the second state STATE2 to the first state STATE1, this should be understood to be only illustrative. That is, the second state STATE2 may be followed by any state other than the first state STATE1.

In this operation example, the second state STATE2 is maintained after occurrence of an overshoot in the output voltage VOUT until its settlement without ever being interrupted. However, so long as an overshoot in the output voltage VOUT can be suppressed, the operation example may be modified such that the second state STATE2 is momentarily interrupted any time after occurrence of an overshoot in the output voltage VOUT before its settlement, or that the second state STATE2 is ended without waiting for settlement of an overshoot in the output voltage VOUT.

<Second Operation Example of the Switching Power Supply Device on Occurrence of an Overshoot in the Output Voltage>

Figure 5:
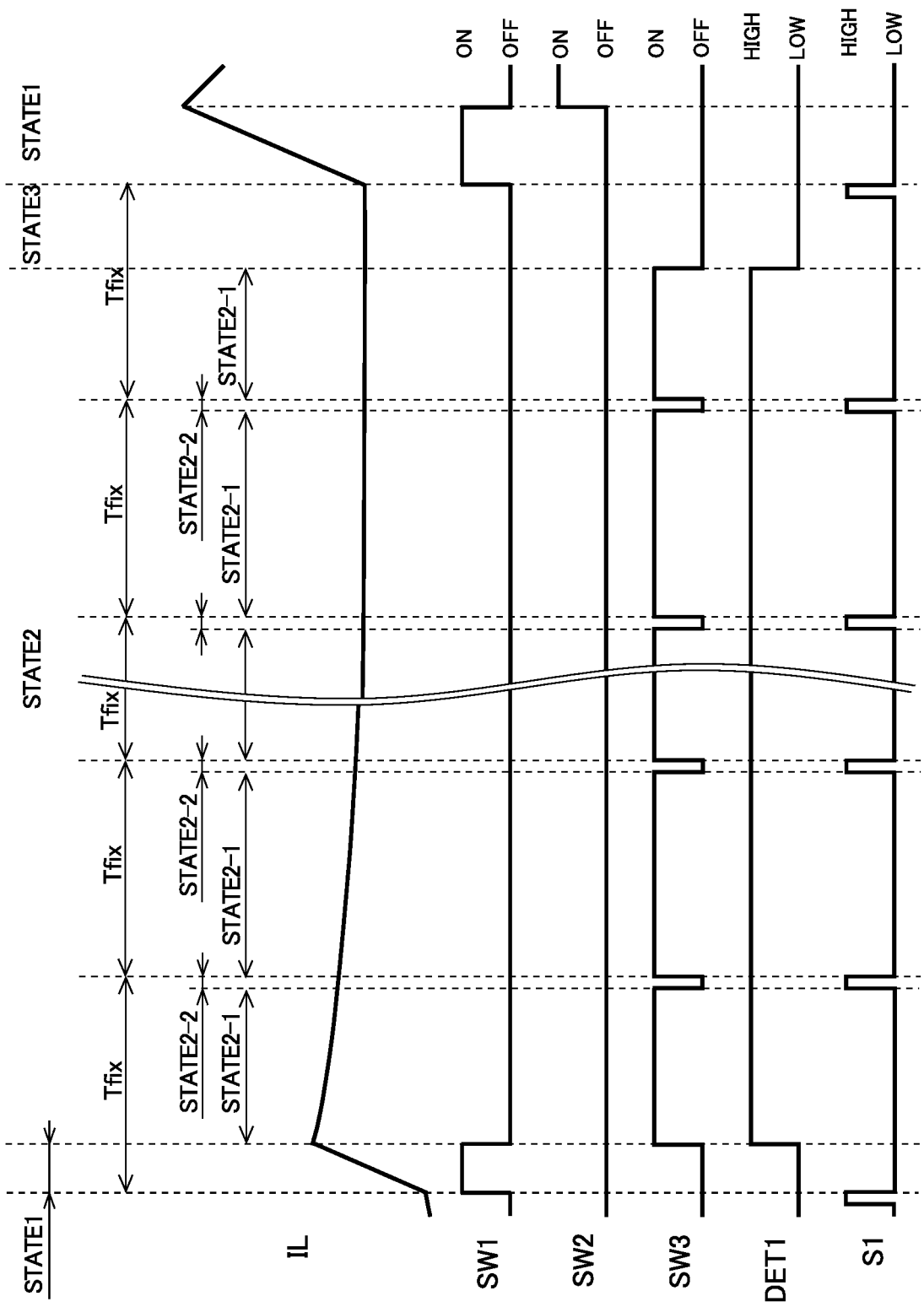
FIG. 5 is a time chart showing a second example of operation of the switching power supply device according to the first configuration example on occurrence of an overshoot in the output voltage.

FIG. 5 is a time chart showing a second example of operation of the switching power supply device 1 on occurrence of an overshoot in the output voltage VOUT.

When the detector DET1 detects occurrence of an overshoot in the output voltage VOUT, under the control of the controller CNT1, the switching power supply device 1 goes into the second state STATE2. FIG. 5 is a time chart observed when the detector DET1 detects occurrence of an overshoot in the output voltage VOUT in the middle of the first state STATE1 (in the middle of the on-duty period of the switch voltage VSW), the output from the detector DET1 turns from low level to high level, and the switching power supply device 1 shifts from the first state STATE1 to the second state STATE2.

In the first state STATE1, under the control of the controller CNT1, the first and second switches SW1 and SW2 turn on and off complementarily at a fixed period Tfix according to a periodic signal S1, and the third switch SW3 remains off. The periodic signal S1 is a signal in which pulses occur at a fixed period Tfix. The periodic signal S1 may be a signal generated within the controller CNT1 or a signal generated outside the controller CNT1 to be received by the controller CNT1. In the complementary turning on and off of the first and second switches SW1 and SW2, it is preferable to provide a dead time period in which both the first and second switches SW1 and SW2 are off.

In the second state STATE2, under the control of the controller CNT1, the first and second switches SW1 and SW2 remain off and the third switch SW3 turns on and off at a fixed period Tfix. In the second state STATE2, the controller CNT1 turns the third switch SW3 on and off according to the periodic signal S1.

In the second state STATE2, a state STATE2-1 and a state STATE2-2 alternate at a fixed period Tfix. The state STATE2-1 is a period in which the third switch SW3 is on, and the state STATE 2-2 is a period in which the third switch SW3 is off.

In this operation example, the switching power supply device 1 is kept in the second state STATE2 until the detector DET1 detects settlement of an overshoot in the output voltage VOUT. While the second state STATE2 is maintained, the inductor current IL falls gradually due to the on-resistance of the third switch SW3. In FIG. 5, when the detector DET1 detects settlement of an overshoot in the output voltage VOUT and the output from the detector DET1 turns from high level to low level, the switching power supply device 1 shifts from the second state STATE2 to a third state STATE3. In the third state STATE3, under the control of the controller CNT1, the first to third switches SW1 to SW3 are kept off.

Then, when, in the third state STATE3, a pulse occurs in the periodic signal S1, a shift from the third state STATE3 to the first state STATE1 takes place.

Now, taking as an example a case where N-channel MOS transistors are used as the first to third switches SW1 to SW3, the state STATE2-1 and the state STATE2-2 will be described in detail. In a modified version of this example, for example, bipolar transistors may be used as the first to third switches SW1 to SW3 with a "reverse-connected diode" connected in parallel with each of the bipolar transistors. The direction in which current passes through the "reverse connection diode" (the direction from the anode to the cathode of the "reverse connection diode") is opposite to the direction in which current passes through the bipolar transistor that is connected in parallel with the "reverse connection diode".

First, a description will be given of a case where the inductor current IL is in the positive direction.

Figure 6:
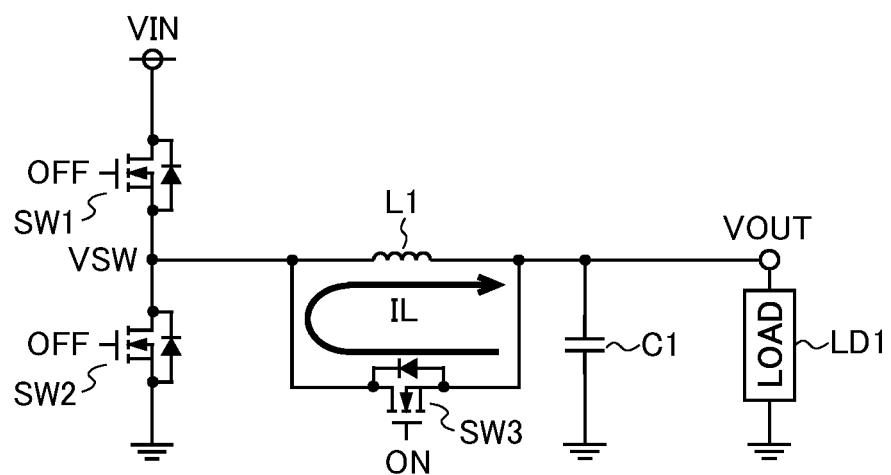
FIG. 6 is a diagram showing how the inductor current is regenerated.

In the state STATE2-1, as shown in FIG. 6, the third switch SW3 is on; thus, the inductor current IL is regenerated in a closed circuit including the inductor L1 and the third switch SW3, and the switching voltage VSW are substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, on occurrence of an overshoot in the output voltage VOUT, the first and second switches SW1 and SW2 can be kept off and the third switch SW3 on, and it is thereby possible to prevent the output voltage VOUT from increasing further, and thus to suppress an overshoot in the output voltage VOUT.

Figure 7:
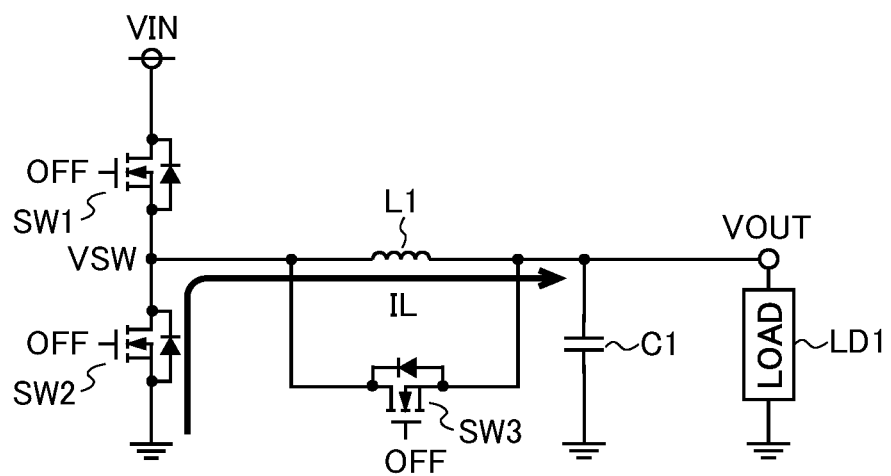
FIG. 7 is a diagram showing how the inductor current passes from the ground via the body diode of a second switch toward an inductor.

In the state STATE2-2, as shown in FIG. 7, the third switch SW3 is off; thus the inductor current IL passes from the ground via the body diode of the second switch SW2 toward the inductor L1. Thus, the switching voltage VSW equals $-Vf_{SW2}$. Here, the $Vf_{SW2}$ is the forward voltage across the body diode of the second switch SW2.

In this operation example, each state STATE2-2 has a fixed duration. More specifically, each state STATE-2-2 has a fixed duration corresponding to the pulse width of the periodic signal S1. It is preferable that the duration of each state STATE2-2 be equal to or shorter than one-tenth of the fixed period Tfix. This is because, if the duration of each state STATE2-2 is longer than one-tenth of the fixed period Tfix, the time required for an overshoot in the output voltage VOUT to settle down exceeds a permissible range.

Figure 8:
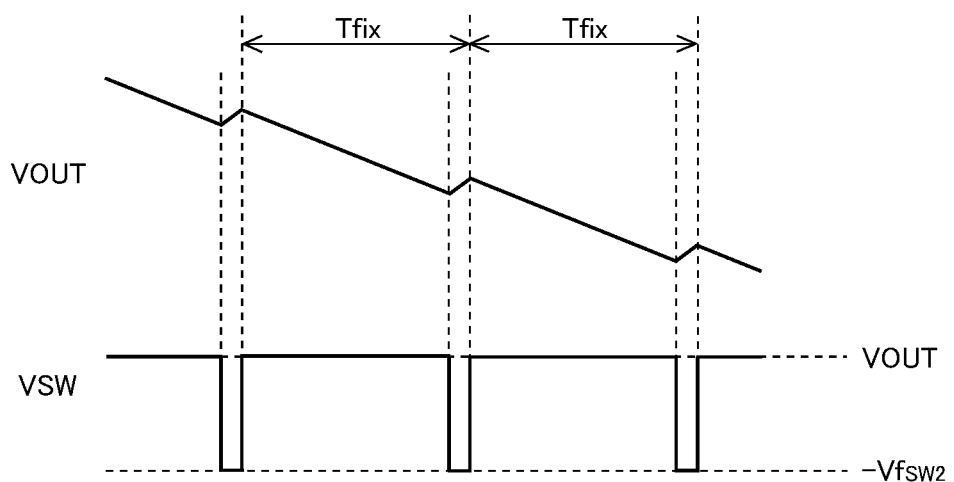
FIG. 8 is waveform diagrams of the output voltage and a switching voltage.

When the inductor current IL is in the positive direction, the output voltage VOUT and the switching voltage VSW in the second state STATE2 are as shown in FIG. 8. Here, the scale of the output voltage VOUT in the vertical direction on the plane of FIG. 8 is enlarged with respect to the switching voltage VSW. As is understood from FIG. 8, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

Next, a description will be given of a case where the inductor current IL is in the negative direction.

Figure 9:
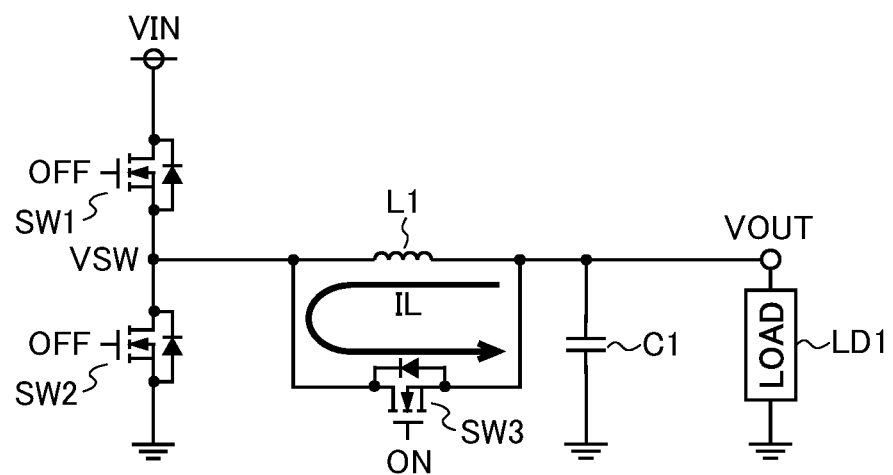
FIG. 9 is a diagram showing how the inductor current is regenerated.

In the state STATE2-1, as shown in FIG. 9, the third switch SW3 is on; thus, the inductor current IL is regenerated in a closed circuit including the inductor L1 and the third switch SW3, and the switching voltage VSW becomes substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, on occurrence of an overshoot in the output voltage VOUT, the first and second switches SW1 and SW2 can be kept off and the third switch SW3 on, and it is thereby possible to prevent the output voltage VOUT from increasing further, and thus to suppress an overshoot in the output voltage VOUT.

Figure 10:
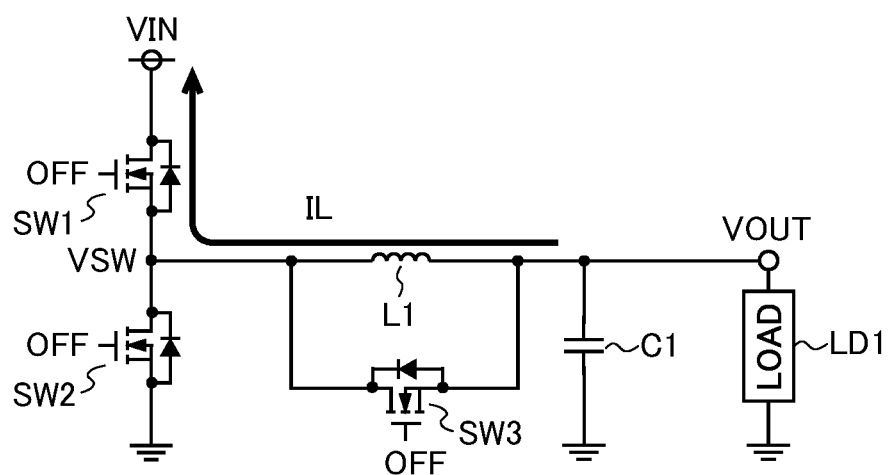
FIG. 10 is a diagram showing how the inductor current passes from the inductor via the body diode of a first switch toward an application terminal for the input voltage.

In the state STATE2-2, as shown in FIG. 10, the third switch SW3 is off; thus the inductor current IL passes from the inductor L1 via the body diode of the first switch SW1 toward the application terminal for the input voltage VIN. Thus, the switching voltage VSW equals $VIN + Vf_{SW1}$. Here, the $Vf_{SW1}$ is the forward voltage across the body diode of the first switch SW1.

Figure 11:
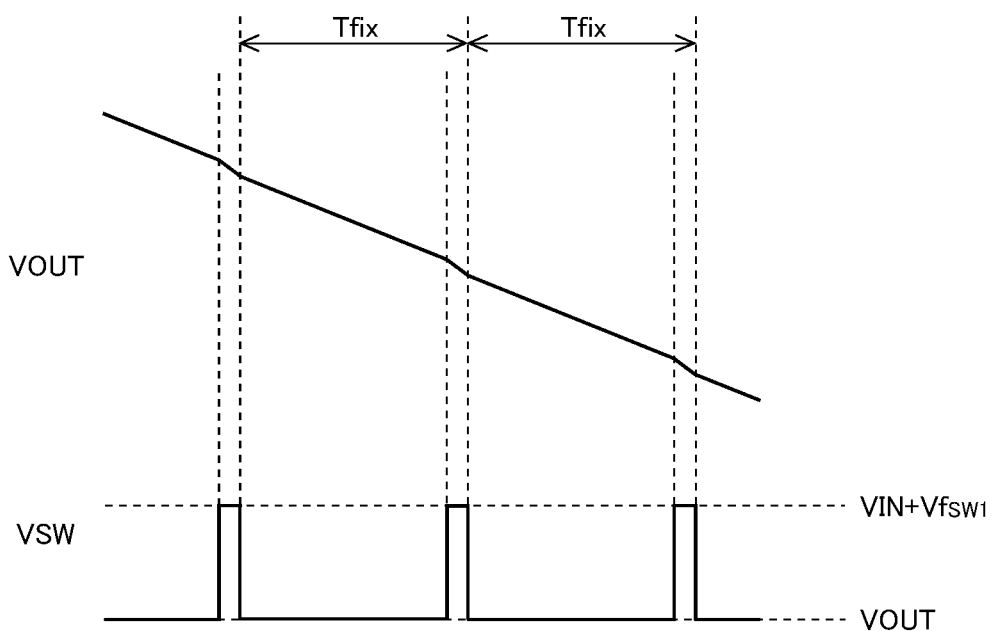
FIG. 11 is waveform diagrams of the output voltage and the switching voltage.

When the inductor current IL is in the negative direction, the output voltage VOUT and the switching voltage VSW in the second state STATE2 are as shown in FIG. 11. Here, the scale of the output voltage VOUT in the vertical direction on the plane of FIG. 11 is enlarged with respect to the switching voltage VSW. As is understood from FIG. 11, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

<Second Configuration Example of the Switching Power Supply Device>

Figure 12A:
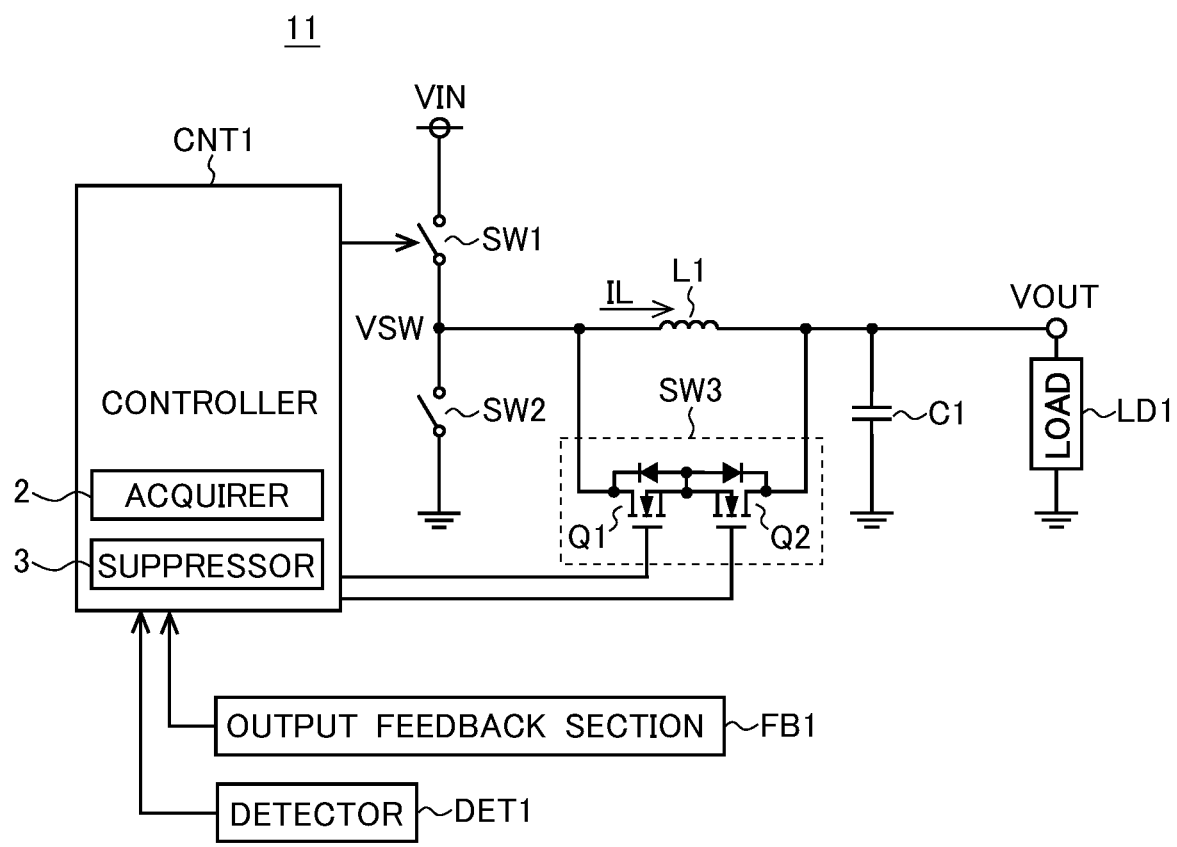
FIG. 12A is a diagram showing a second configuration example of an asynchronous rectification switching power supply device.
Figure 12B:
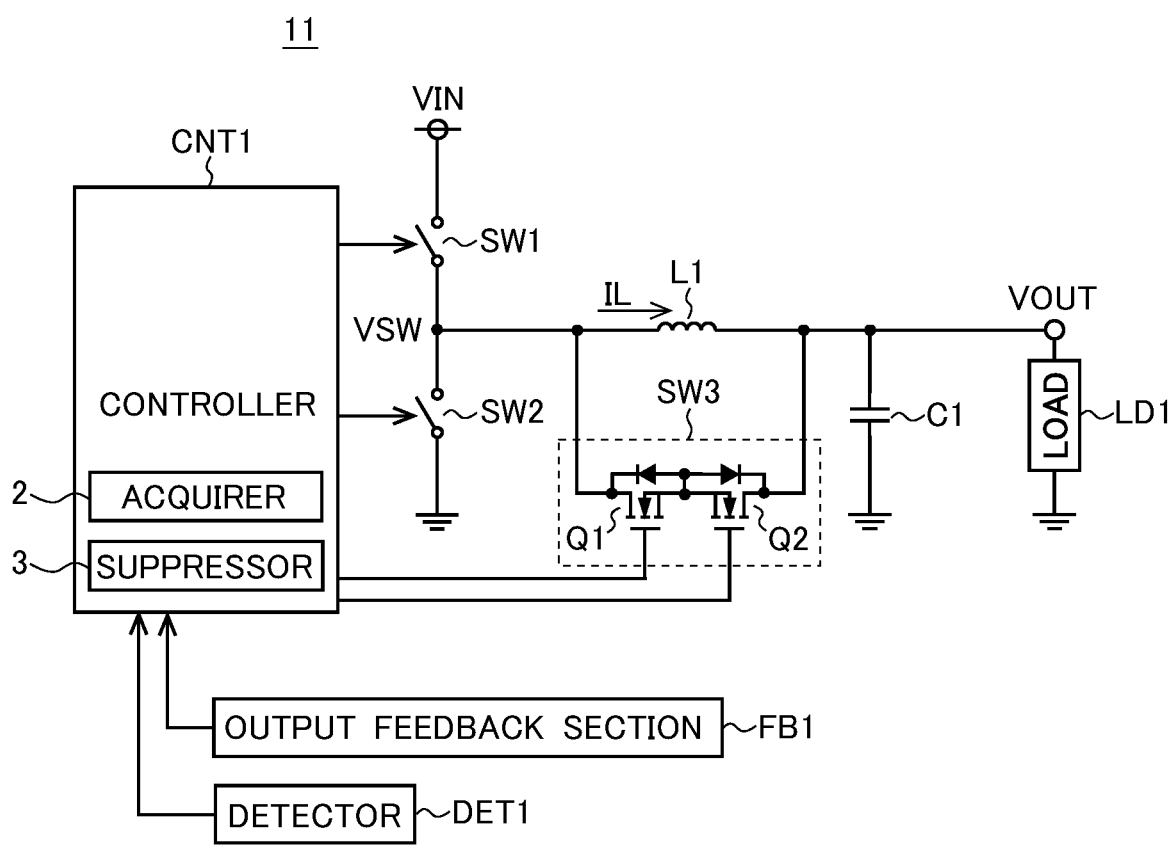
FIG. 12B is a diagram showing a second configuration example of a synchronous rectification switching power supply device.

FIGS. 12A and 12B are diagrams showing a second configuration example of the switching power supply device. In FIGS. 12A and 12B, for features similar to those in FIGS. 1A and 1B, no overlapping description will be repeated. The switching power supply device 11 shown in FIGS. 12A and 12B is a switching power supply device that bucks (steps down) an input voltage VIN to an output voltage VOUT and includes a controller CNT1, a first to a third switch SW1 to SW3, an inductor L1, an output capacitor C1, an output feedback section FB1, and a detector DET1. The diodes shown in FIGS. 12A and 12B are the body diodes of MOS transistors. Likewise, also the diodes shown in FIGS. 14, 15, 17, 18, 20, 21, 23, 24, 26, 27, 29, 30, and 33 referred to later are the body diodes of MOS transistors.

In this configuration example, a suppressor 3 turns on and off the first, second, and third switches SW1, SW2, and SW in accordance with the detection result from the detector DET1 that is acquired by the acquirer 2, and, after the detector DET1 detects occurrence of an overshoot in the output voltage VOUT until the detector DET1 detects settlement of the overshoot in the output voltage VOUT, the suppressor 3 keeps the first and second switches SW1 and SW2 off and turns the third switch SW3 on and off at a fixed period to suppress the overshoot in the output voltage VOUT.

For example, with a diode used as the second switch SW2, the switching power supply device 11 acts as an asynchronous rectification switching power supply device as shown in FIG. 12A.

When the switching power supply device 11 acts as an asynchronous rectification switching power supply device, the controller CNT1 controls the bias voltage applied to the switch SW2 (diode) by turning the switch SW1 on and off. Whether the switch SW2 (diode) is on or off is determined by the bias voltage applied to the switch SW2 (diode); thus, the controller CNT1 turns the switch SW2 (diode) on and off indirectly.

For example, with an N-channel MOS transistor used as the second switch SW2, the switching power supply device 11 acts as a synchronous rectification switching power supply device as shown in FIG. 12B. When the switching power supply device 11 acts as a synchronous rectification switching power supply device, the switching power supply device 11 may be configured to operate in a current continuous mode under a light load or may be configured to have a reverse current prevention function and operate in a current discontinuous mode under a light load.

As the third switch SW3, for example, an N-channel MOS transistor can be used. The third switch SW3 includes a first switching element and a second switching element that are connected in series with each other. In the configuration example shown in FIGS. 12A and 12B, as the first and second switching elements, two N-channel MOS transistors Q1 and Q2 are used. The drain of the N-channel MOS transistor Q1 is connected to the connection node between the first and second switches SW1 and SW2. The source and the back gate of the N-channel MOS transistor Q1 is connected to the source and the back gate of the N-channel MOS transistor Q2. The drain of the N-channel MOS transistor Q2 is connected to the connection node between the inductor L1 and the output capacitor C1. The N-channel MOS transistor Q1 is provided in the input side and the N-channel MOS transistor Q2 is provided in the output side; thus, preferably, the N-channel MOS transistor Q1 is given a higher withstand voltage than the N-channel MOS transistor Q2.

Figure 13:
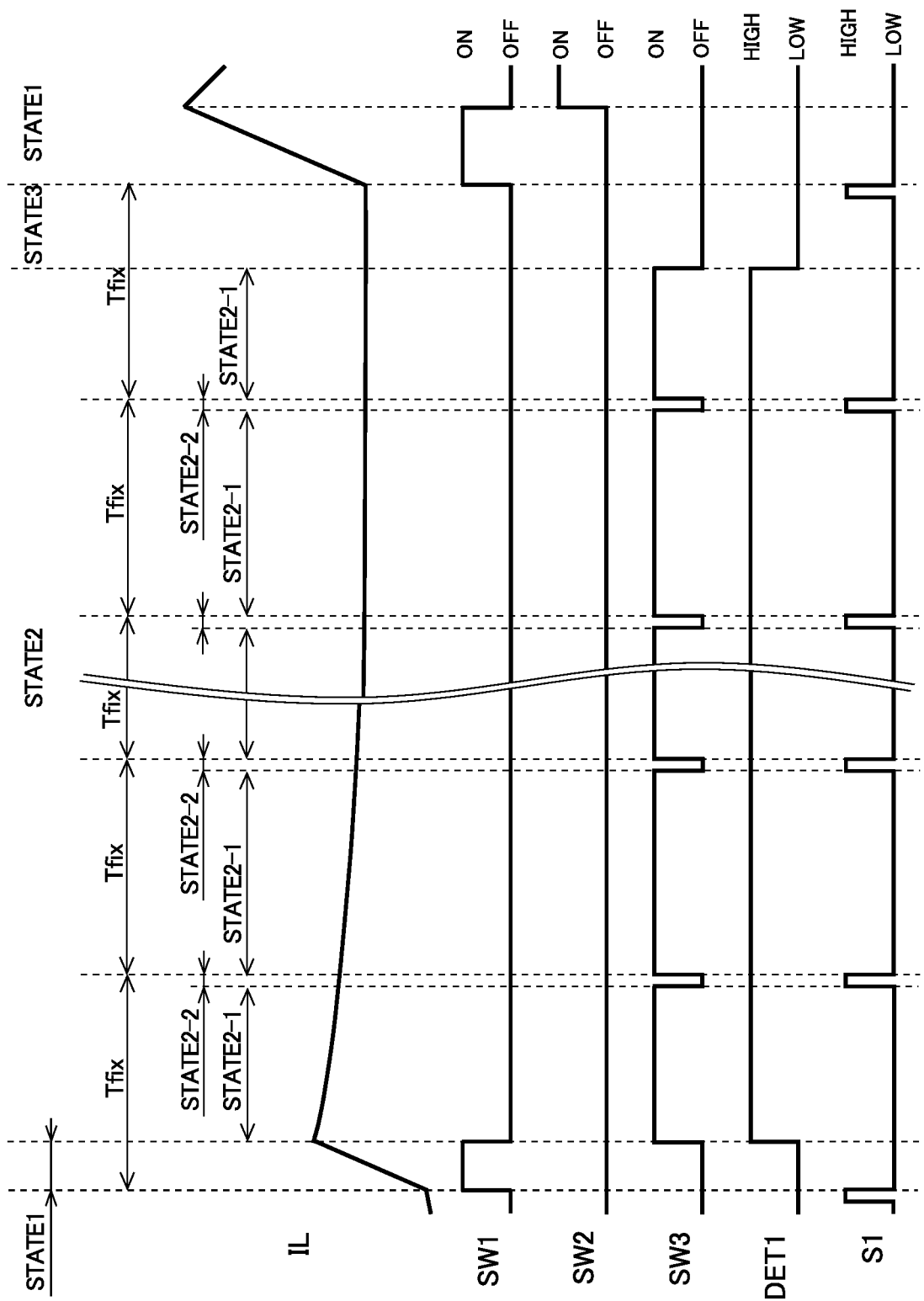
FIG. 13 is a time chart showing an example of operation of the switching power supply device according to the second configuration example on occurrence of an overshoot in an output voltage.

The detector DET1 detects occurrence and settlement of an overshoot in the output voltage VOUT. As the detector DET1, for example, a comparator can be used that receives the output voltage VOUT at its non-inverting input terminal and receives a constant voltage (a voltage higher than the target value of the output voltage VOUT) at its inverting input terminal. When an overshoot occurs in the output voltage VOUT, the comparator switches its output signal from low level to high level. When the overshoot in the output voltage VOUT settles down, the comparator switches its output signal from high level to low level. FIG. 13 referred to later shows the output signal in this example.

A configuration is also possible where the comparator receives, instead of the output voltage VOUT, a division voltage of the output voltage VOUT at its non-inverting input terminal and receives, instead of the constant voltage, a division voltage of the constant voltage at its inverting input terminal.

Also, by configuring the comparator as a hysteresis comparator or by providing a comparator for detecting occurrence of an overshoot and a comparator for detecting settlement of an overshoot separately, it is possible to differentiate the value of the output voltage VOUT at which to detect occurrence of an overshoot and that at which to detect settlement of an overshoot.

In a modified version of the configuration example under discussion, when the detector DET1 detects a sign of occurrence of an overshoot in the output voltage VOUT, the suppressor 3 described above keeps the first and second switches SW1 and SW2 off and turns the third switch SW3 on and off at a fixed period so as to suppress the overshoot in the output voltage VOUT.

A sign of occurrence of an overshoot in the output voltage VOUT can be detected, for example with a load LD1 that varies regularly and that becomes lighter sharply after a specific variation pattern, by detecting a variation pattern in the load current that corresponds to that specific variation pattern.

<Operation Example of the Switching Power Supply Device on Occurrence of an Overshoot in the Output Voltage>

FIG. 13 is a time chart showing the operation of the switching power supply device 11 on occurrence of an overshoot in the output voltage VOUT.

When the detector DET1 detects occurrence of an overshoot in the output voltage VOUT, under the control of the controller CNT1, the switching power supply device 11 goes into a second state STATE2. FIG. 13 is a time chart observed when the detector DET1 detects occurrence of an overshoot in the output voltage VOUT in the middle of a first state STATE1 (in the middle of the on-duty period of the switching voltage VSW), the output from the detector DET1 turns from low level to high level, and the switching power supply device 11 shifts from the first state STATE1 to the second state STATE2.

In the first state STATE1, under the control of the controller CNT1, the first and second switches SW1 and SW2 turn on and off complementarily at a fixed period Tfix according to a periodic signal S1, and the third switch SW3 remains off. The periodic signal S1 is a signal in which pulses occur at a fixed period Tfix. The periodic signal S1 may be a signal generated within the controller CNT1 or a signal generated outside the controller CNT1 to be received by the controller CNT1. In the complementary turning on and off of the first and second switches SW1 and SW2, it is preferable to provide a dead time period in which both the first and second switches SW1 and SW2 are off.

In the second state STATE2, under the control of the controller CNT1, the first and second switches SW1 and SW2 remain off and the third switch SW3 turns on and off at a fixed period. In the second state STATE2, the controller CNT1 turns the third switch SW3 on and off according to the periodic signal S1.

In the second state STATE2, a state STATE2-1 and a state STATE2-2 alternate at the fixed period Tfix. The state STATE2-1 is a period in which the third switch SW3 is on, and the state STATE 2-2 is a period in which the third switch SW3 is off.

In this operation example, the switching power supply device 11 is kept in the second state STATE2 until the detector DET1 detects settlement of an overshoot in the output voltage VOUT. While the second state STATE2 is maintained, the inductor current IL falls gradually due to the on-resistance of the third switch SW3. In FIG. 13, when the detector DET1 detects settlement of an overshoot in the output voltage VOUT and the output from the detector DET1 turns from high level to low level, the switching power supply device 11 shifts from the second state STATE2 to the third state STATE3. In the third state STATE3, under the control of the controller CNT1, the first to third switches SW1 to SW3 are kept off.

Then, when, in the third state STATE3, a pulse occurs in the periodic signal S1, a shift from the third state STATE3 to the first state STATE1 takes place.

Now, taking as an example a case where N-channel MOS transistors are used as the first and second switches SW1 and SW2, the state STATE2-1 and the state STATE2-2 will be described in detail, in each of three control patterns. In a modified version of this example, for example, bipolar transistors may be used as the first and second switches SW1 and SW2 with a "reverse connection diode" connected in parallel with each of the bipolar transistors. The direction in which current passes through the "reverse connection diode" (the direction from the anode to the cathode of the "reverse connection diode") is opposite to the direction in which current passes through the bipolar transistor that is connected in parallel with the "reverse connection diode". Likewise, bipolar transistors may be used instead of the N-channel MOS transistors Q1 and Q2 with a "reverse connection diode" connected in parallel with each of the bipolar transistors.

<First Control Pattern>

First, a description will be given of a case where the inductor current IL is in the positive direction.

Figure 14:
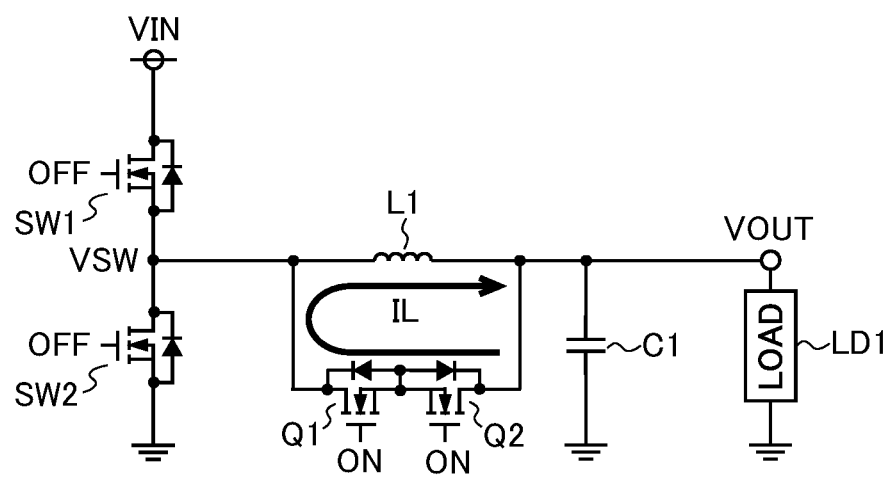
FIG. 14 is a diagram showing how the inductor current is regenerated (a first control pattern)

In the state STATE2-1, as shown in FIG. 14, the N-channel MOS transistors Q1 and Q2 are kept on; thus, the inductor current IL is regenerated in a closed circuit including the inductor L1 and the N-channel MOS transistors Q1 and Q2, and the switching voltage VSW is substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, by keeping the first and second switches SW1 and SW2 off and the N-channel MOS transistors Q1 and Q2 on when an overshoot occurs in the output voltage VOUT, it is possible to prevent the output voltage VOUT from increasing further, and thus to suppress an overshoot in the output voltage VOUT.

Figure 15:
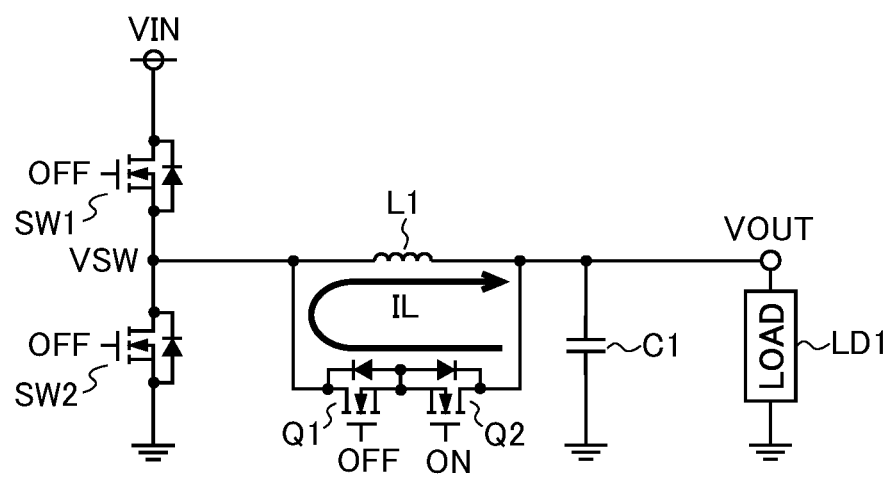
FIG. 15 is a diagram showing how the inductor current passes from the ground via the body diode of the second switch toward the inductor (the first control pattern)

In the state STATE2-2, as shown in FIG. 15, the N-channel MOS transistor Q1 is kept off; thus, the inductor current IL is regenerated in a closed circuit including the inductor L1, the body diode of the N-channel MOS transistor Q1, and the N-channel MOS transistor Q2. Thus, the switching voltage VSW equals VOUT–$Vf_{Q1}$. Here, the $Vf_{Q1}$ is the forward voltage across the body diode of the N-channel MOS transistor Q1.

In this operation example, each state STATE2-2 has a fixed duration. More specifically, each state STATE-2-2 has a fixed duration corresponding to the pulse width of the periodic signal S1. It is preferable that the duration of each state STATE2-2 be equal to or shorter than one-tenths of the fixed period Tfix. This is because, if the duration of each state STATE2-2 is longer than one-tenths of the fixed period Tfix, the time required for an overshoot in the output voltage VOUT to settle down exceeds a permissible range.

Figure 16:
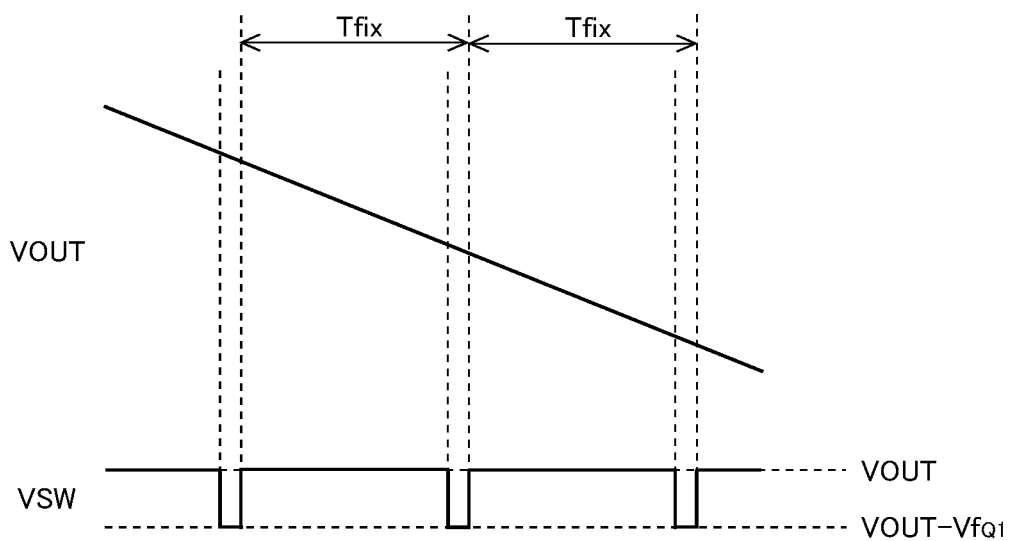
FIG. 16 is waveform diagrams of the output voltage and the switching voltage (the first control pattern)

When the inductor current IL is in the positive direction, the output voltage VOUT and the switching voltage VSW in the second state STATE2 are as shown in FIG. 16. Here, the scale of the output voltage VOUT in the vertical direction on the plane of FIG. 16 is enlarged with respect to the switching voltage VSW. As is understood from FIG. 16, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

Next, a description will be given of a case where the inductor current IL is in the negative direction.

Figure 17:
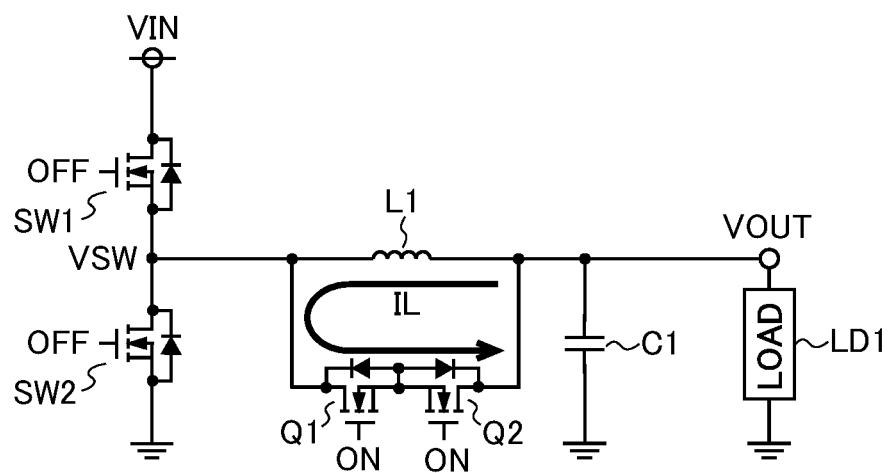
FIG. 17 is a diagram showing how the inductor current is regenerated (the first control pattern)

In the state STATE2-1, as shown in FIG. 17, the N-channel MOS transistors Q1 and Q2 are kept on; thus, the inductor current IL is regenerated in a closed circuit including the inductor L1 and the N-channel MOS transistors Q1 and Q2, and the switching voltage VSW is substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, by keeping the first and second switches SW1 and SW2 off and the N-channel MOS transistors Q1 and Q2 on when an overshoot occurs in the output voltage VOUT, it is possible to prevent the output voltage VOUT from increasing further, and thus to suppress an overshoot in the output voltage VOUT.

Figure 18:
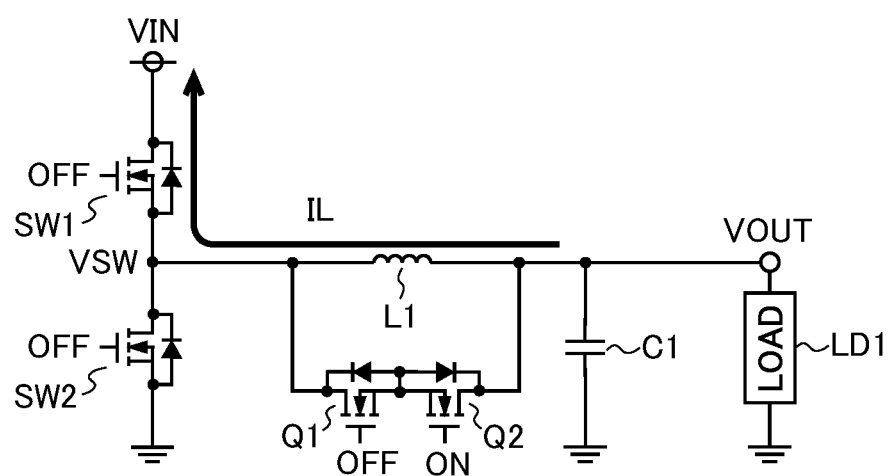
FIG. 18 is a diagram showing how the inductor current passes from the inductor via the body diode of the first switch toward the application terminal for the input voltage (the first control pattern)

In the state STATE2-2, as shown in FIG. 18, the N-channel MOS transistor Q1 is off; thus the inductor current IL passes from the inductor L1 via the body diode of the first switch SW1 toward the application terminal for the input voltage VIN. Thus, the switching voltage VSW equals VIN+$VF_{SW1}$. Here, the $Vf_{SW1}$ is the forward voltage across the body diode of the first switch SW1.

Figure 19:
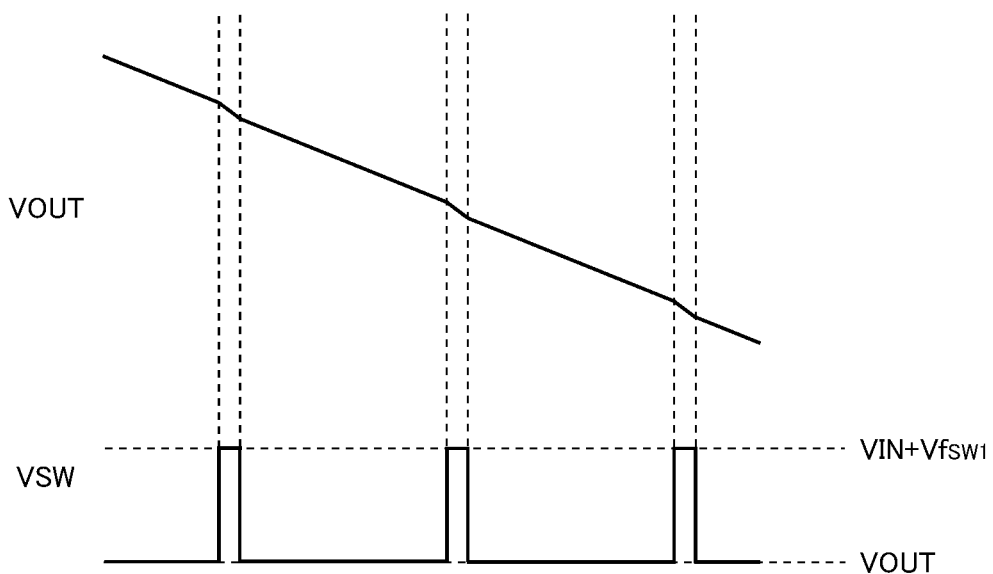
FIG. 19 is waveform diagrams of the output voltage and the switching voltage (the first control pattern)

When the inductor current IL is in the negative direction, the output voltage VOUT and the switching voltage VSW in the second state STATE2 is as shown in FIG. 19. Here, the scale of the output voltage VOUT in the vertical direction on the plane of FIG. 19 is enlarged with respect to the switching voltage VSW. As is understood from FIG. 19, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

<Second Control Pattern>

First, a description will be given of a case where the inductor current IL is in the positive direction.

Figure 20:
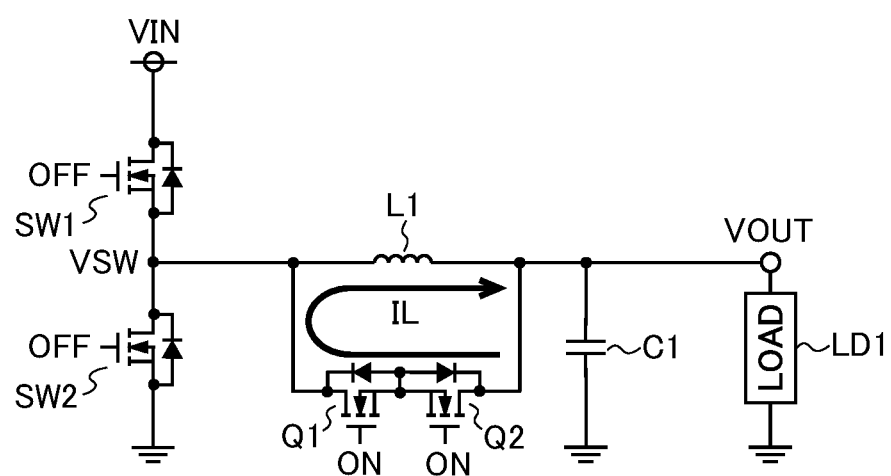
FIG. 20 is a diagram showing how the inductor current is regenerated (a second control pattern)

In the state STATE2-1, as shown in FIG. 20, the N-channel MOS transistors Q1 and Q2 are kept on; thus, the inductor current IL is regenerated in a closed circuit including the inductor L1 and the N-channel MOS transistors Q1 and Q2, and the switching voltage VSW is substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, by keeping the first and second switches SW1 and SW2 off and the N-channel MOS transistors Q1 and Q2 on when an overshoot occurs in the output voltage VOUT, it is possible to prevent the output voltage VOUT from increasing further, and thus to suppress an overshoot in the output voltage VOUT.

Figure 21:
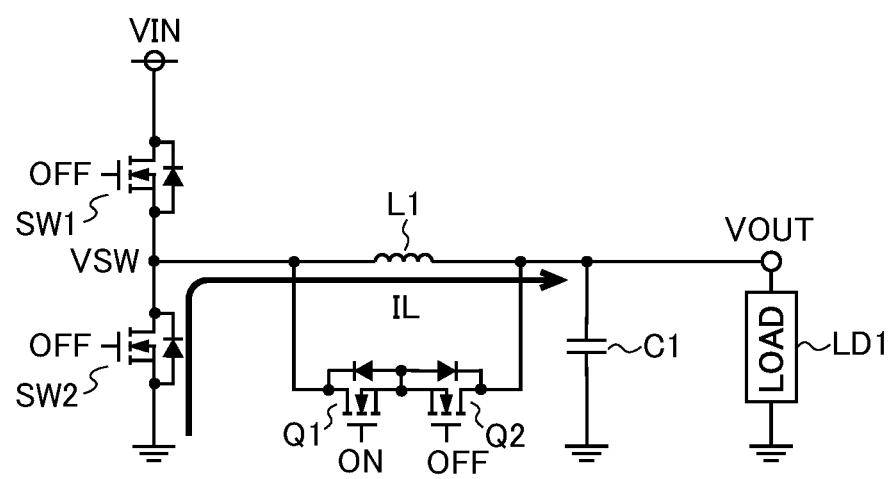
FIG. 21 is a diagram showing how the inductor current passes from the ground via the body diode of the second switch toward the inductor (the second control pattern)

In the state STATE2-2, as shown in FIG. 21, the N-channel MOS transistor Q2 is off; thus the inductor current IL passes from the ground via the body diode of the second switch SW2 toward the inductor L1. Thus, the switching voltage VSW equals –$Vf_{SW2}$. Here, the $Vf_{SW2}$ is the forward voltage across the body diode of the second switch SW2.

Figure 22:
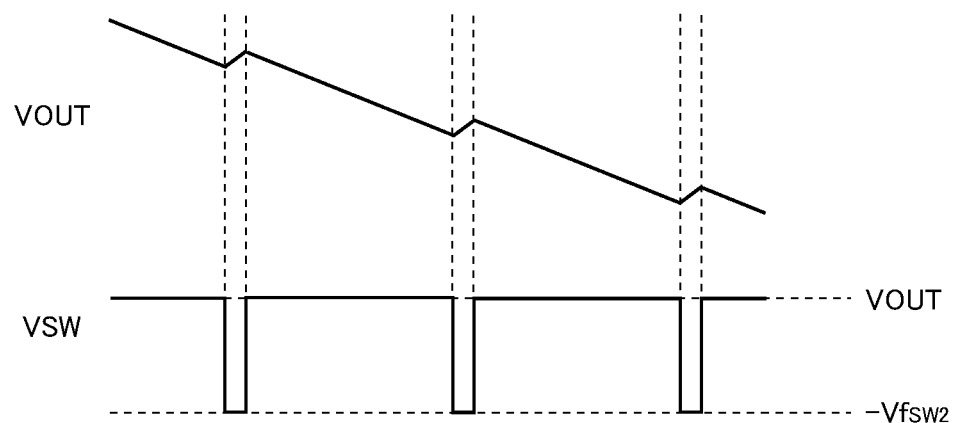
FIG. 22 is waveform diagrams of the output voltage and the switching voltage (the second control pattern)

When the inductor current IL is in the positive direction, the output voltage VOUT and the switching voltage VSW in the second state STATE2 are as shown in FIG. 22. Here, the scale of the output voltage VOUT in the vertical direction on the plane of FIG. 22 is enlarged with respect to the switching voltage VSW. As is understood from FIG. 22, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

Next, a description will be given of a case where the inductor current IL is in the negative direction.

Figure 23:
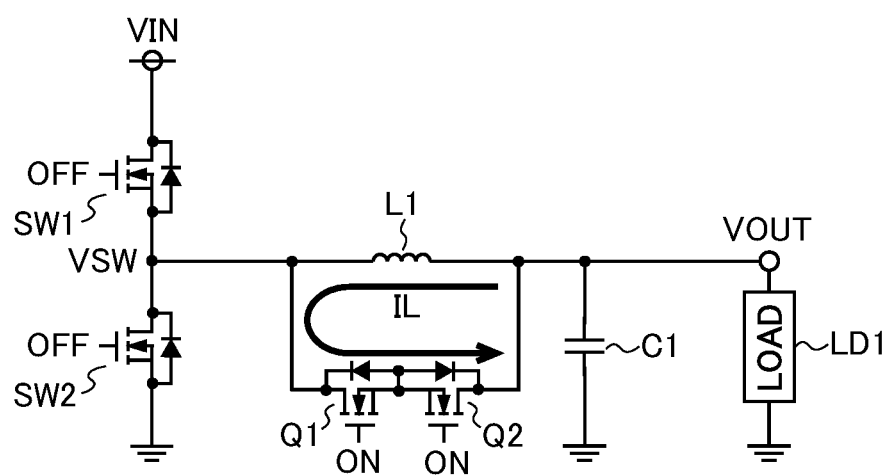
FIG. 23 is a diagram showing how the inductor current is regenerated (the second control pattern)

In the state STATE2-1, as shown in FIG. 23, the N-channel MOS transistors Q1 and Q2 are kept on; thus, the inductor current IL is regenerated in a closed circuit including the inductor L1 and the N-channel MOS transistors Q1 and Q2, and the switching voltage VSW is substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, by keeping the first and second switches SW1 and SW2 off and the N-channel MOS transistors Q1 and Q2 on when an overshoot occurs in the output voltage VOUT, it is possible to prevent the output voltage VOUT from increasing further, and thus to suppress an overshoot in the output voltage VOUT.

Figure 24:
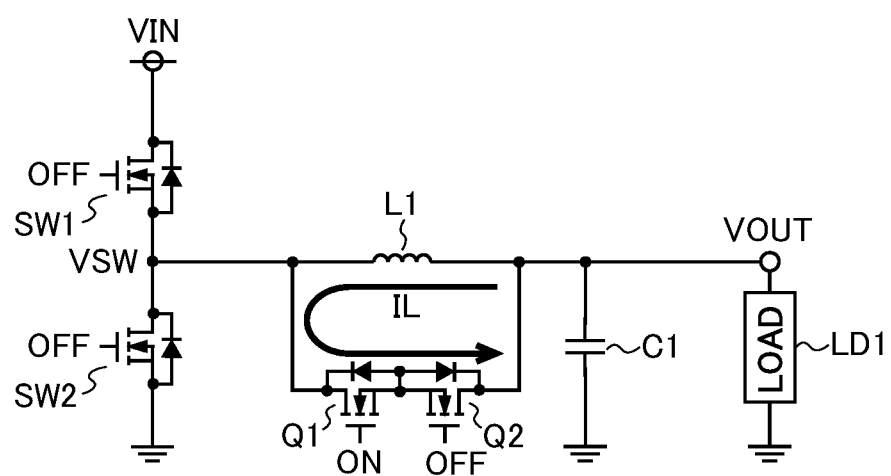
FIG. 24 is a diagram showing how the inductor current passes from the inductor via the body diode of the first switch toward the application terminal for the input voltage (the second control pattern)

In the state STATE2-2, as shown in FIG. 24, the N-channel MOS transistor Q2 is kept off; thus, the inductor current IL is regenerated in a closed circuit including the inductor L1, the N-channel MOS transistor Q1, and the body diode of the N-channel MOS transistor Q2. Thus, the switching voltage VSW equals VOUT+Vf$_{Q2}$. Here, the Vf$_{Q2}$ is the forward voltage across the body diode of the N-channel MOS transistor Q2.

Figure 25:
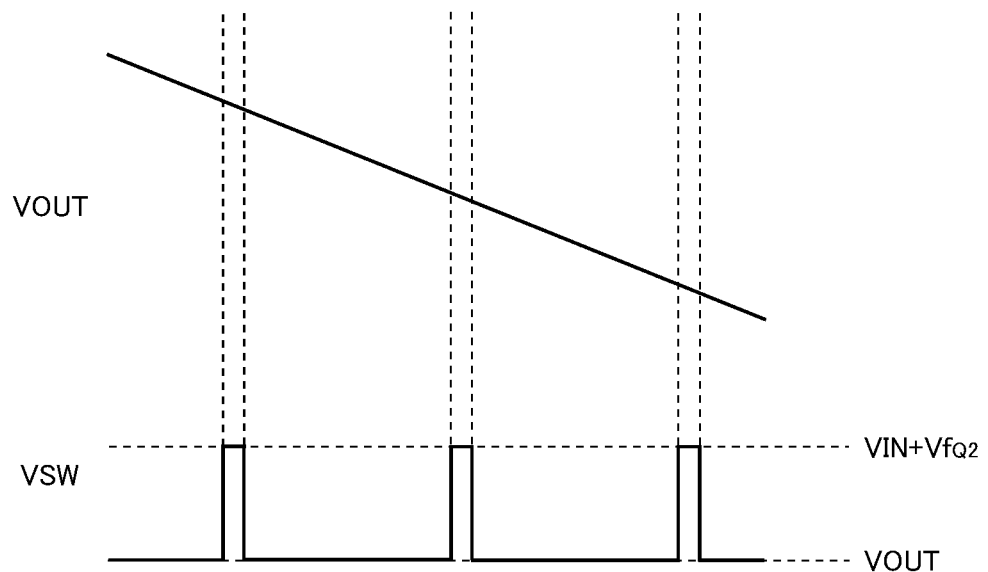
FIG. 25 is waveform diagrams of the output voltage and the switching voltage (the second control pattern)

When the inductor current IL is in the negative direction, the output voltage VOUT and the switching voltage VSW in the second state STATE2 are as shown in FIG. 25. Here, the scale of the output voltage VOUT in the vertical direction on the plane of FIG. 25 is enlarged with respect to the switching voltage VSW. As is understood from FIG. 25, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

<Third Control Pattern>

First, a description will be given of a case where the inductor current IL is in the positive direction.

Figure 26:
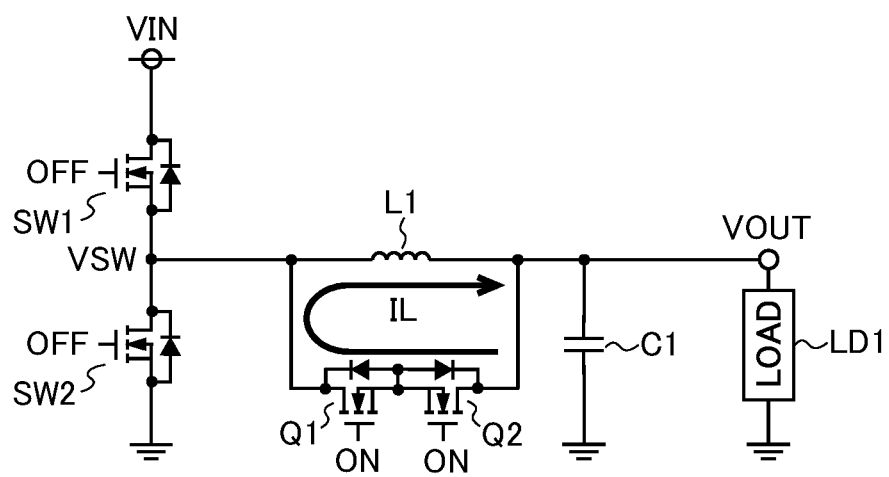
FIG. 26 is a diagram showing how the inductor current is regenerated (a third control pattern)

In the state STATE2-1, as shown in FIG. 26, the N-channel MOS transistors Q1 and Q2 are kept on; thus, the inductor current IL is regenerated in a closed circuit including the inductor L1 and the N-channel MOS transistors Q1 and Q2, and the switching voltage VSW is substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, by keeping the first and second switches SW1 and SW2 off and the N-channel MOS transistors Q1 and Q2 on when an overshoot occurs in the output voltage VOUT, it is possible to prevent the output voltage VOUT from increasing further, and thus to suppress an overshoot in the output voltage VOUT.

Figure 27:
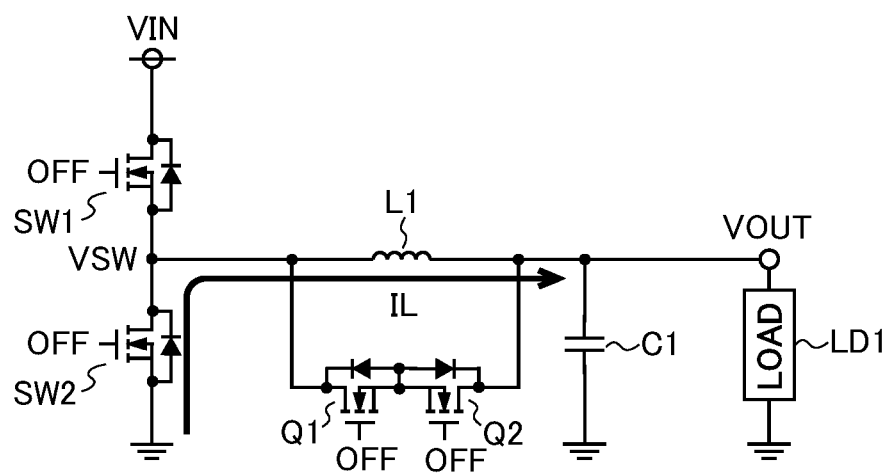
FIG. 27 is a diagram showing how the inductor current passes from the ground via the body diode of a second switch toward the inductor (the third control pattern)

In the state STATE2-2, as shown in FIG. 27, the N-channel MOS transistors Q1 and Q2 are off; thus the inductor current IL passes from the ground via the body diode of the second switch SW2 toward the inductor L1. Thus, the switching voltage VSW equals −Vf$_{SW2}$.

Figure 28:
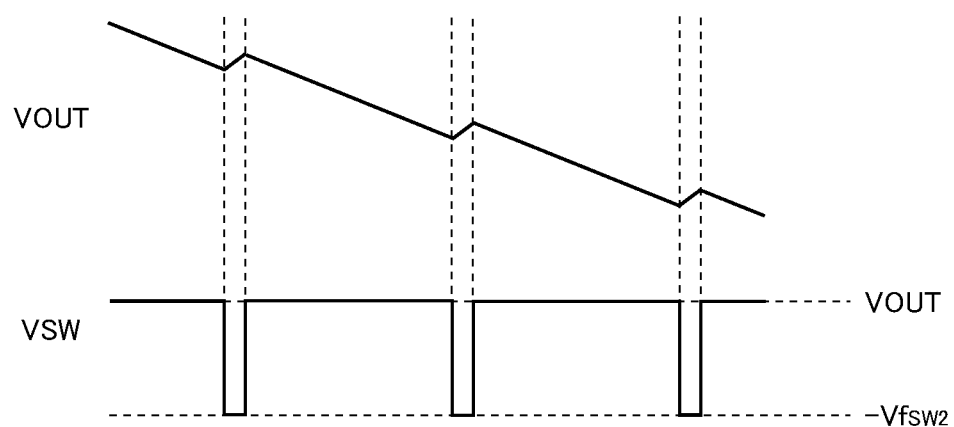
FIG. 28 is waveform diagrams of the output voltage and the switching voltage (the third control pattern)

When the inductor current IL is in the positive direction, the output voltage VOUT and the switching voltage VSW in the second state STATE2 are as shown in FIG. 28. Here, the scale of the output voltage VOUT in the vertical direction on the plane of FIG. 28 is enlarged with respect to the switching voltage VSW. As is understood from FIG. 28, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

Next, a description will be given of a case where the inductor current IL is in the negative direction.

Figure 29:
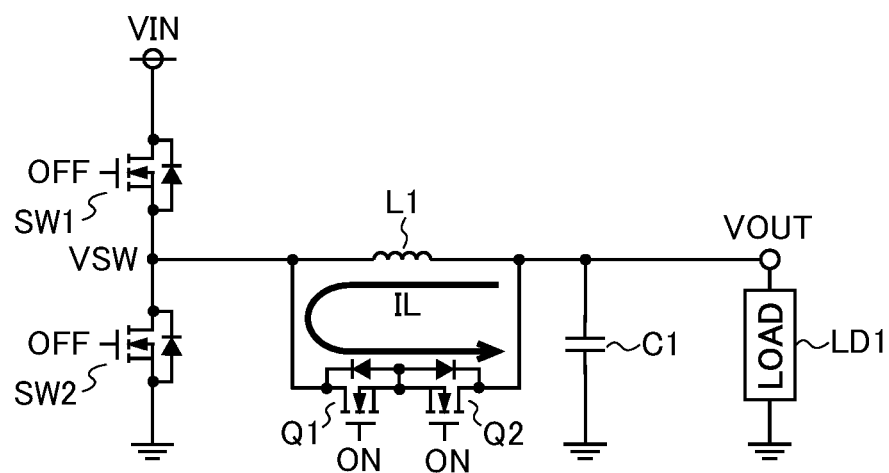
FIG. 29 is a diagram showing how the inductor current is regenerated (the third control pattern)

In the state STATE2-1, as shown in FIG. 29, the N-channel MOS transistors Q1 and Q2 are kept on; thus, the inductor current IL is regenerated in a closed circuit including the inductor L1 and the N-channel MOS transistors Q1 and Q2, and the switching voltage VSW is substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, by keeping the first and second switches SW1 and SW2 off and the N-channel MOS transistors Q1 and Q2 on when an overshoot occurs in the output voltage VOUT, it is possible to prevent the output voltage VOUT from increasing further, and thus to suppress an overshoot in the output voltage VOUT.

Figure 30:
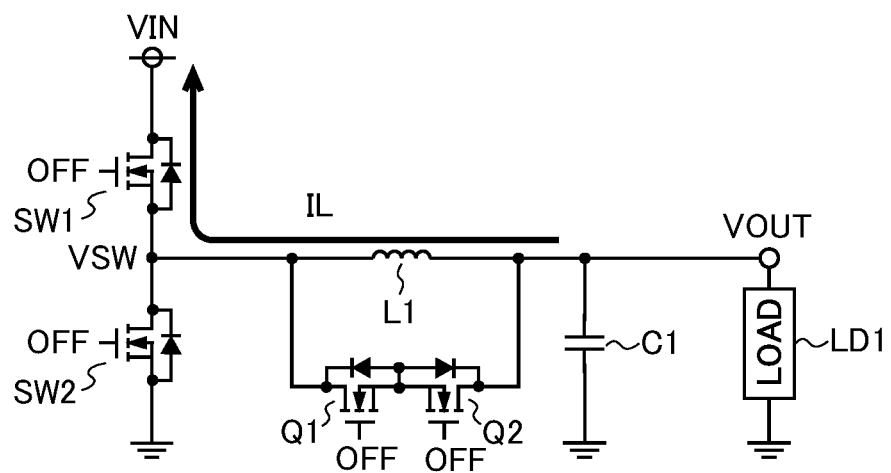
FIG. 30 is a diagram showing how the inductor current passes from the inductor via the body diode of the first switch toward the application terminal for the input voltage (the third control pattern)

In the state STATE2-2, as shown in FIG. 30, the N-channel MOS transistors Q1 and Q2 are off; thus the inductor current IL passes from the inductor L1 via the body diode of the first switch SW1 toward the application terminal for the input voltage VIN. Thus, the switching voltage VSW equals VIN+VF$_{SW1}$.

Figure 31:
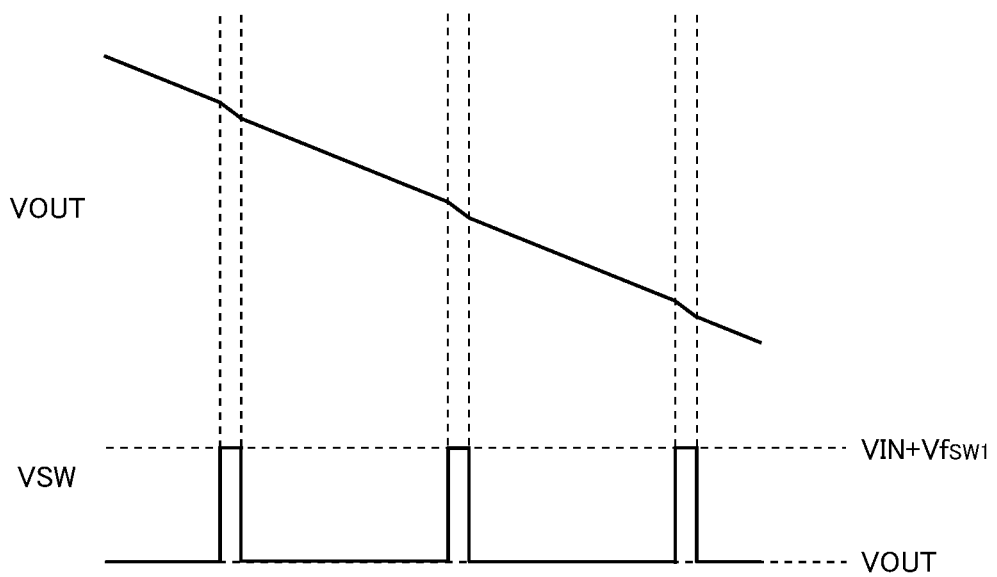
FIG. 31 is waveform diagrams of the output voltage and the switching voltage (the third control pattern)

When the inductor current IL is in the negative direction, the output voltage VOUT and the switching voltage VSW in the second state STATE2 are as shown in FIG. 31. Here, the scale of the output voltage VOUT in the vertical direction on the plane of FIG. 31 is enlarged with respect to the switching voltage VSW. As is understood from FIG. 31, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

<Applications>

Figure 32:
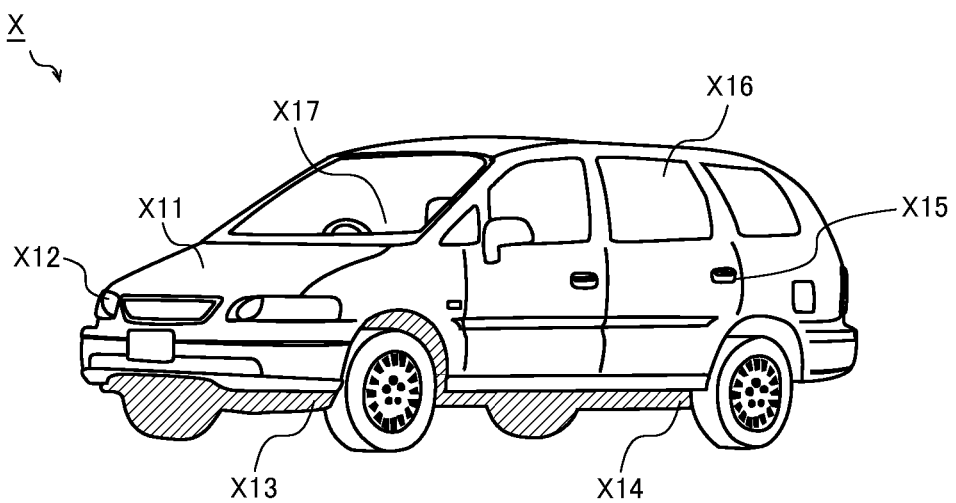
FIG. 32 is an exterior view showing one configuration example of a vehicle.
Figure 33:
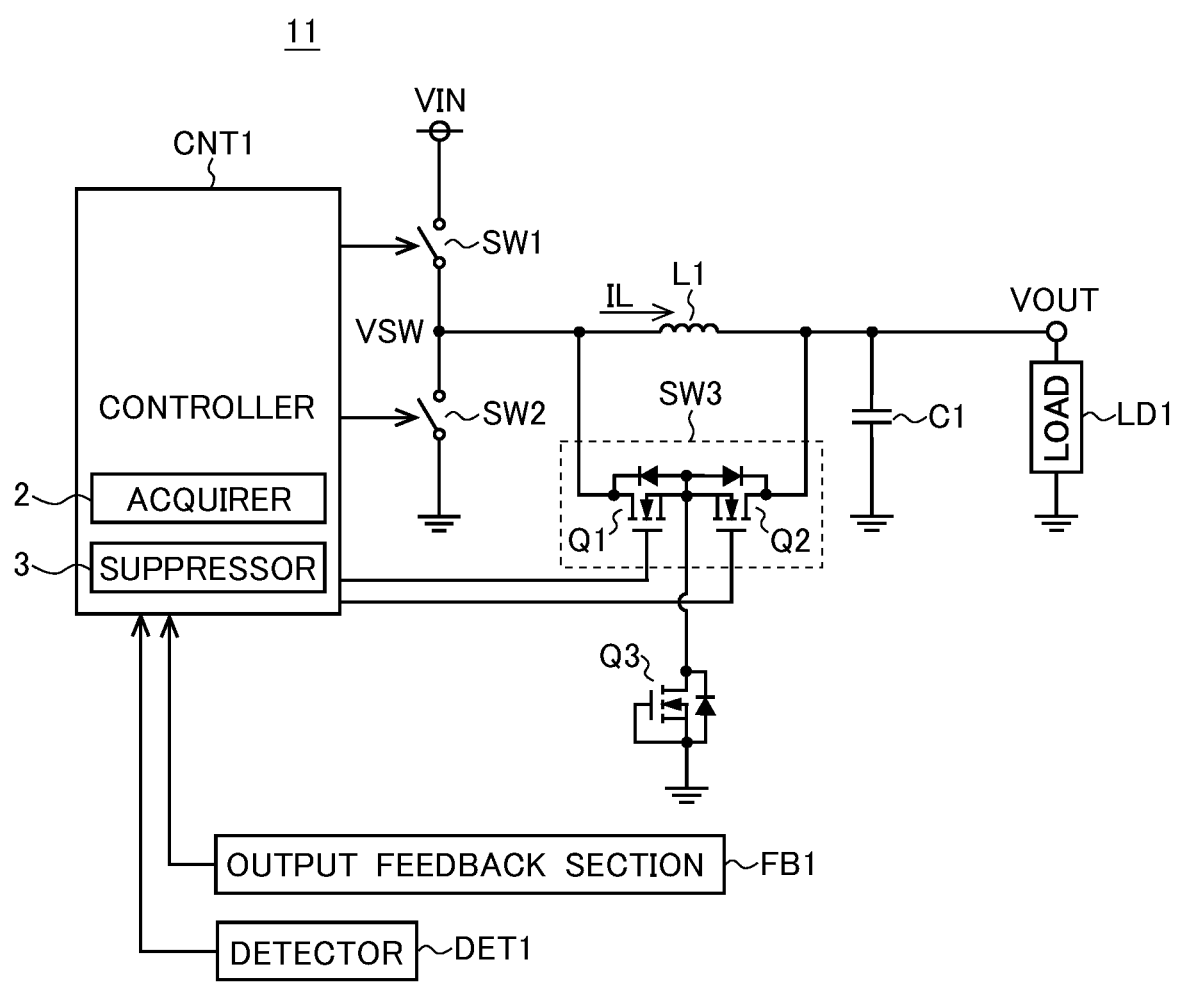
FIG. 33 is a diagram showing a modified example of the synchronous rectification switching power supply device according to the second configuration example.

Next, an example of application of the switching power supply devices 1 and 11 described previously will be described. FIG. 32 is an exterior view showing an exemplary configuration of a vehicle incorporating vehicle-mounted appliances. The vehicle X of this exemplary configuration incorporates vehicle-mounted appliances X11 to X17 and a battery (not shown) that feeds electric power to the vehicle-mounted appliances X11 to X17.

The vehicle-mounted appliance X11 is an engine control unit that performs control related to the engine (such as the control of injection, electronic throttling, idling, an oxygen sensor heater, and automatic cruising).

The vehicle-mounted appliance X12 is a lamp control unit that controls turning on/off of HIDs (high-intensity discharge lamps) and DRLs (daytime running lamps).

The vehicle-mounted appliance X13 is a transmission control unit that performs control related to transmission.

The vehicle-mounted appliance X14 is a body control unit that performs control related to the movement of the vehicle X (such as the control of an ABS (anti-lock braking system), EPS (electric power steering), and electronic suspension).

The vehicle-mounted appliance X15 is a security control unit that controls the driving of door locks, burglar alarms, and the like.

The vehicle-mounted appliance X16 comprises electronic appliances incorporated in the vehicle X as standard or manufacturer-fitted equipment at the stage of factory shipment, such as wipers, power side mirrors, power windows, a power sun roof, power seats, and an air conditioner.

The vehicle-mounted appliance X17 comprises electronic appliances fitted to the vehicle X optionally as user-fitted equipment, such as vehicle mounted AV (audio-visual) equipment, a car navigation system, and an ETC (electronic toll collection system).

The switching power supply devices 1 and 11 described previously can be incorporated into any of the vehicle-mounted appliances X11 to X17.

<Notes>

The present invention can be implemented in any manner other than as in the embodiments described above, with any modifications made within the spirit of the present invention. The embodiments disclosed herein should be considered to be in every aspect illustrative and not restrictive, and the technical scope of the present invention is defined not by the description of embodiments given above but by the scope of the appended claims and should be understood to encompass any modifications within a sense and scope equivalent to the claims.

In the second operation example described above, for example, when the inductor current IL is in the positive direction, the controller CNT1 may keep the second switch SW2 on in the state STATE2-2. Or, for example, when the inductor current IL is in the negative direction, the controller CNT1 may keep the first switch SW1 on in the state STATE2-2.

In the second operation example described above, for example, the set value for the fixed period Tfix may be variable. By changing the period of the periodic signal S1, it is possible to change the set value for the fixed period Tfix.

In the operation example of the switching power supply device 11 described above, for example, when the inductor current IL is in the positive direction in the second or third control pattern, the controller CNT1 may keep the second switch SW2 on in the state STATE2-2. Or, for example, when the inductor current IL is in the negative direction in the first or third control pattern, the controller CNT1 may keep the first switch SW1 on in the state STATE2-2.

In the operation example of the switching power supply device 11 described above, for example, the set value for the fixed period Tfix may be variable. By changing the period of the periodic signal S1, it is possible to change the set value for the fixed period Tfix.

In the switching power supply device 11 described above, it is preferable that a clamper be provided that clamps the voltage at the connection node between the first and second switching elements described above within a predetermined range. For example, in the modified example shown in FIG. 33, the body diode of the N-channel MOS transistor Q3 is used as the damper mentioned above. The drain of the N-channel MOS transistor Q3 is connected to the connection node between the N-channel MOS transistor Q1 used as the first switching element and the N-channel MOS transistor Q2 used as the second switching element. The gate and the source of the N-channel MOS transistor Q3 is connected to the ground potential. In the modified example shown in FIG. 33, the lower limit value of the voltage at the connection node between the N-channel MOS transistors Q1 and Q2 equals the value resulting from subtracting the forward voltages across the body diode of the N-channel MOS transistor Q3 from the ground potential. In the modified example shown in FIG. 33, the upper limit value of the voltage at the connection node between the N-channel MOS transistors Q1 and Q2 equals the avalanche breakdown voltage of the body diode of the N-channel MOS transistor Q3.

INDUSTRIAL APPLICABILITY

This invention finds application in bucking switching power supply devices used in any fields (in the fields of home electrical appliances, automobiles, industrial machinery, and so on).

LIST OF REFERENCE SIGNS 1, 11 switching power supply device
2 acquirer
3 suppressor
C1 output capacitor
CNT1 controller
DET1 detector
FB1 output feedback section
L1 inductor
LD1 load
Q1 to Q5 N-channel MOS transistor
SW1 to SW3 first to third switches
X vehicle
X11 to X17 vehicle-mounted appliance

The invention claimed is:

1. A switching power supply device configured to buck an input voltage to an output voltage, the switching power supply device comprising:
   a first switch configured such that a first terminal thereof is connectable to an application terminal for the input voltage and that a second terminal thereof is connectable to a first terminal of an inductor;
   a second switch configured such that a first terminal thereof is connectable to the first terminal of the inductor and to the second terminal of the first switch, and that a second terminal thereof is connectable to an application terminal for a voltage lower than the input voltage;
   a third switch configured such that a first terminal thereof is connectable to the first terminal of the inductor, to the second terminal of the first switch, and to the first terminal of the second switch, and that a second terminal thereof is connectable to a second terminal of the inductor;
   a detector configured to detect occurrence, or a sign of occurrence, of an overshoot in the output voltage; and
   a controller configured to turn on and off the first, second, and third switches,
   wherein the controller is configured to produce, after occurrence, or a sign of occurrence, of an overshoot in the output voltage is detected by the detector until the overshoot in the output voltage settles down, a control state in which the first and second switches are kept off and the third switch is kept on, the detector is configured to detect also settlement of an overshoot in the output voltage, and the controller is configured such that, in a period after the detector detects occurrence, or sign of occurrence, of an overshoot in the output voltage until the detector detects settlement of the overshoot in the output voltage, the controller keeps the first switch off when at least the third switch is on, keeps the second switch off when at least the third switch is on, and turns on and off the third switch at a fixed period.

2. The switching power supply device according to claim 1, wherein in a period after the detector detects occurrence, or a sign of occurrence, of an overshoot in the output voltage until the detector detects settlement of the overshoot in the output voltage, an off-period of the third switch has a fixed duration.

3. The switching power supply device according to claim 2, wherein in a period after the detector detects occurrence, or a sign of occurrence, of an overshoot in the output voltage until the detector detects settlement of the overshoot in the output voltage, the duration of the off-period of the third switch is equal to or shorter than one-tenth of the fixed period.

4. The switching power supply device according to claim 1 configured to generate a voltage of 1.8 MHz or higher but 2.1 MHz or lower at a connection node between the first and second switches.

5. The switching power supply device according to claim 1, wherein the third switch includes a first switching element and a second switching element that are connected in series with each other.

6. The switching power supply device according to claim 5, wherein
in an on-period of the third switch, the first and second switching elements are on, and
in the off-period of the third switch, the first switching element is off and the second switching element is on.

7. The switching power supply device according to claim 5, further comprising a clamper configured to clamp a voltage at a connection node between the first and second switching elements within a predetermined range.

8. A vehicle-mounted appliance comprising the switching power supply device according to claim 1.

9. A switch control device configured to turn on and off
a first switch configured such that a first terminal thereof is connectable to an application terminal for an input voltage, and that a second terminal thereof is connectable to a first terminal of an inductor,
a second switch configured such that a first terminal thereof is connectable to the first terminal of the inductor and to the second terminal of the first switch, and that a second terminal thereof is connectable to an application terminal for a voltage lower than the input voltage, and
a third switch configured such that a first terminal thereof is connectable to the first terminal of the inductor, to the second terminal of the first switch, and to the first terminal of the second switch, and that a second terminal thereof is connectable to a second terminal of the inductor,
the switch control device comprising:

an acquirer configured to acquire a detection result from a detector for detecting occurrence, or sign of occurrence, of an overshoot in the output voltage; and a suppressor configured to turn on and off the first, second, and third switches in accordance with the detection result acquired by the acquirer to suppress an overshoot in the output voltage by producing, after occurrence, or a sign of occurrence, of an overshoot in the output voltage is detected by the detector until the overshoot in the output voltage settles down, a control state in which the first and the second switches are kept off and the third switch is kept on, wherein the detector is configured to detect also settlement of an overshoot in the output voltage, and the suppressor is configured such that, in a period after the detector detects occurrence, or a sign of occurrence, of an overshoot in the output voltage until the detector detects settlement of the overshoot in the output voltage, the suppressor keeps the first switch off when at least the third switch is on, keeps the second switch off when at least the third switch is on, and turns on and off the third switch at a fixed period to suppress an overshoot in the output voltage.

10. The switch control device according to claim 9, wherein in a period after the detector detects occurrence, or a sign of occurrence, of an overshoot in the output voltage until the detector detects settlement of the overshoot in the output voltage, the off-period of the third switch has a fixed duration.

11. The switching control device according to claim 10, wherein in a period after the detector detects occurrence, or a sign of occurrence, of an overshoot in the output voltage until the detector detects settlement of the overshoot in the output voltage, the duration of the off-period of the third switch is equal to or shorter than one-tenth of the fixed period.

12. A switch control device according to claim 9 configured to generate a voltage of 1.8 MHz or higher but 2.1 MHz or lower at a connection node between the first and second switches.

13. The switching control device according to claim 9, wherein the third switch includes a first switching element and a second switching element that are connected in series with each other.

14. The switch control device according to claim 13, wherein
in the on-period of the third switch, the first and second switching elements are on, and
in the off-period of the third switch, the first switching element is off and the second switching element is on.

15. A vehicle-mounted appliance comprising the switch control device according to claim 9.

16. A vehicle comprising:
the vehicle-mounted appliance according to claim 8; and
a battery for supplying the vehicle-mounted appliance with electric power.

17. A vehicle comprising:
the vehicle-mounted appliance according to claim 15; and
a battery for supplying the vehicle-mounted appliance with electric power.

* * * * *